United States Patent
Hankins et al.

(10) Patent No.: US 9,401,904 B1
(45) Date of Patent: Jul. 26, 2016

(54) SECURITY MIGRATION IN A BUSINESS INTELLIGENCE ENVIRONMENT

(71) Applicant: Motio, Inc., Dallas, TX (US)

(72) Inventors: Lance W. Hankins, Allen, TX (US); Jonathan Edmund James, Savannah, TX (US)

(73) Assignee: Motio, Inc., Dallas, TX (US)

( * ) Notice: Subject to any disclaimer, the term of this patent is extended or adjusted under 35 U.S.C. 154(b) by 517 days.

(21) Appl. No.: 13/842,347

(22) Filed: Mar. 15, 2013

Related U.S. Application Data

(60) Provisional application No. 61/611,408, filed on Mar. 15, 2012.

(51) Int. Cl.
*H04L 29/06* (2006.01)

(52) U.S. Cl.
CPC ....................................... *H04L 63/08* (2013.01)

(58) Field of Classification Search
None
See application file for complete search history.

(56) References Cited

U.S. PATENT DOCUMENTS

| | | | |
|---|---|---|---|
| 6,385,661 B1 | 5/2002 | Guthrie et al. | |
| 6,877,163 B1 | 4/2005 | Jones et al. | |
| 7,330,971 B1* | 2/2008 | Kukreja | H04L 63/083 709/203 |
| 7,590,669 B2* | 9/2009 | Yip | H04L 41/0816 707/999.002 |
| 7,865,931 B1* | 1/2011 | Stone | G06F 21/31 713/170 |
| 8,086,710 B2 | 12/2011 | Vanyukhin et al. | |
| 8,478,799 B2* | 7/2013 | Beaverson | G06F 17/30097 707/823 |
| 8,635,679 B2* | 1/2014 | Hardt | G06F 21/6254 713/155 |
| 8,726,358 B2 | 5/2014 | Rouskov et al. | |
| 8,849,955 B2* | 9/2014 | Prahlad | G06F 17/3002 709/211 |
| 2003/0135628 A1* | 7/2003 | Fletcher | H04L 29/06 709/229 |
| 2005/0050354 A1* | 3/2005 | Gociman | G06F 21/6218 726/4 |
| 2007/0100701 A1* | 5/2007 | Boccon-Gibod et al. | 705/21 |
| 2007/0255530 A1* | 11/2007 | Wolff | G06F 21/64 702/187 |
| 2009/0192847 A1* | 7/2009 | Lipkin | G06F 9/468 726/4 |
| 2011/0126275 A1* | 5/2011 | Anderson | H04L 9/3213 726/8 |
| 2011/0145580 A1* | 6/2011 | Auradkar | H04L 63/0428 713/170 |
| 2013/0160084 A1* | 6/2013 | Hansen | G06F 21/6227 726/4 |

OTHER PUBLICATIONS

Masmoudi, Khaled; Afifi, Hossam. An identity-based key management framework for personal networks. 21st International Conference on Advanced Information Networking and Application Workshops, 2007. AINAW '07. vol. 1. Relevant pp. 537-543. http://ieeexplore.ieee.org/stamp/stamp.jsp?tp=&arnumber=4221113.*

Radia, Sanjay; Pachl, Jan. The Per-Process View of Naming and Remote Execution. Proceedings of the Twenty-Sixth Hawaii International Conference on System Sciences, 1993. vol. II. Relevant pp. 377-386. http://ieeexplore.ieee.org/stamp/stamp.jsp?tp=&arnumber=284090.*

(Continued)

*Primary Examiner* — Jeremiah Avery
(74) *Attorney, Agent, or Firm* — Elizabeth Philip Dahm; Kelly J. Kubasta; Ferguson, Braswell & Fraser, PC

(57) ABSTRACT

In various implementations, local identifiers associated with users may be utilized to enable access one or more functions in a Business Intelligence (BI) Environment. A mapping may be generated to associate local identifiers and users. The mapping may be utilized to enable access in the BI environment by retrieving the local identifier from a mapping and enabling access in the BI environment based on the local identifier. In various implementations, a user may access the system as another user.

18 Claims, 8 Drawing Sheets

(56) References Cited

OTHER PUBLICATIONS

IBM Cognos (R) Access Manager Administrator Guide, IBM, Jul. 2006.
IBM Cognos(R) v. 8.4.1 Administration and Security Guide, IBM, Oct. 2009.
IBM Cognos (R) v. 8.4.1 Architecture and Development Guide, IBM, Oct. 2009.
IBM Cognos (R) v. 8.4.1 Custom Authentication Provider Developer Guide, IBM, Oct. 2009.
SpotON Namespace Migration (TM) Professional Installation Guide v. 3.1, SpotOn Systems Inc., Apr. 2010.

* cited by examiner

SECURITY MIGRATION IN A BUSINESS INTELLIGENCE ENVIRONMENT

CROSS-REFERENCE TO RELATED APPLICATION

This application claims priority to U.S. Provisional Patent Application No. 61/611,408, entitled "Persona", filed on Mar. 15, 2012, which is hereby incorporated by reference for all purposes.

TECHNICAL FIELD

The present invention relates to the seamless migration of identity information in business intelligence environments.

BACKGROUND

In modern business, increasing standards, automation, and technologies have led to vast amounts of data becoming available. BI systems make it possible to collect, identify, extract, analyze, and report business data in a User- and business-friendly manner.

Users may access a Business Intelligence (BI) environment to access one or more functions resources and/or capabilities of the BI environment. Namespaces in the BI environment may be used in conjunction with external security sources to authenticate, authorize and/or validate users. An external security source may verify user identification (e.g., username and/or password, biometric identifiers, security tokens, etc.) provided by a user or the user's computing environment to authenticate the user and allow access to the BI environment.

SUMMARY

In various implementations, at least a portion of a plurality of security principals defined in a First External Security Source may be retrieved, and at least one or more local identifiers associated with the retrieved security principal(s) may be retrieved from a First Security Namespace. Each local identifier uniquely identifies one of the security principals in a Business Intelligence Environment. The local identifier(s) may be generated by the First Security Namespace, and the First Security Namespace may expose the security principal(s) from the First External Security Source for functions in the Business Intelligence Environment using the local identifier(s). A mapping of at least a portion of the retrieved security principals and the retrieved associated local identifier(s) may be generated and the generated mapping may be stored in a memory coupled to a Security Migration System. A Security Migration System Namespace may be provided that coordinates with the Security Migration System to expose the security principal(s) to the Business Intelligence Environment using the local identifier(s), from the generated mapping and previously used by the First Security Namespace. wherein the Security Migration System Namespace is adapted to enable access in the Business Intelligence Environment that is based on the generated mapping and that is not limited to user authentication by the First External Security Source.

Implementations may include one or more of the following features. Access to the First External Security Source may be restricted and the Security Migration System Namespace may provide access in the Business Intelligence Environment, for the security principal(s) defined in the First External Security Source, based on the local identifier(s) in the generated mapping, when access to the First External Security Source is restricted. The First Security Namespace may be replaced with the Security Migration System Namespace. The Security Migration System may self-validate at least a portion of the security principals based at least partially on the generated mapping. The Security Migration System Namespace may replace the First Security Namespace and may provide access in the Business Intelligence Environment using the local identifier(s) previously generated by the First Security Namespace. In some implementations, the Security Migration System Namespace may enable access in the Business Intelligence Environment, for the security principal(s) defined in the First External Security Source, based on the local identifier(s) generated by the First Security Namespace, when access to the First Security Namespace is restricted. In some implementations, the security principal(s) in the mapping may be authenticated based at least partially on the Security Migration System Namespace, and access in the Business Intelligence environment may be allowed using the local identifier(s) in the generated mapping.

In some implementations, additional security principals defined in a Second External Security Source may be retrieved, and the Security Migration System Namespace may be allowed to be associated with the additional security principal(s). The Security Migration System Namespace may generate additional local identifier(s). Each additional local identifier uniquely identifies one of the additional security principal(s). The Security Migration System Namespace may expose the security principal(s) from the Second External Security Source for functions in the Business Intelligence Environment using the additional local identifier(s). Authentication of security principals may be allowed utilizing the Second External Security Source and/or the Security Migration System Namespace. Access in the Business Intelligence environment may be enabled based on the local identifier(s) in the generated mapping and/or the additional local identifier(s) generated by the Security Migration System Namespace for the additional security principals. The Security Migration System Namespace may delegate validation of at least a portion of the security principals in the generated mapping to the Second External Security Source. In some implementations, one or more matching security principals may be identified based on a determination of whether security principal(s) in the generated mapping are the same as the additional security principal(s), and the additional association(s) in the mapping may be generated. The additional association(s) may include an association of the local identifier(s) in the mapping that are associated with the matching security principal(s) and the additional security principal(s) such that validation of a matching security principal may be delegated to the Second External Security Source and such that access in the Business Intelligence Environment may be allowed based on at least one of the local identifiers from the generated mapping. In some implementations, candidate improvement(s) may be identified. Identifying candidate improvement(s) may include analyzing the generated mapping, security information and/or access information, and determining candidate improvement(s) based at least partially on the analysis. In some implementations, the generated mapping may be analyzed. The analysis of the generated mapping may identify difference(s) in access, roles, and/or privilege for a user, and identifying candidate improvement(s) may include identifying the difference(s).

In various implementations, an authentication request may be received, for a Security Migration System Namespace, for authorization for access to a Business Intelligence Environment of a user based on provided user identification information. A determination may be made whether to authorize the access by requesting validation of the user based at least partially on the provided user identification information, and a local identifier associated with the validated user may be determined at least partially based on a retrieved mapping, if a determination is made to authorize a user. The retrieved mapping may include local identifiers generated by a different Security Namespace. Access in the Business Intelligence Environment may enable at least partially on the determined local identifier.

Implementations may include one or more of the following features. The request for authentication may be delegated, based at least partially on the provided user identification information, from the Security Migration System Namespace to an External Security Source. In some implementations, a type of user may be determined at least partially based on the provided user identification information, and the provided user identification information may be authenticated independently of an External Security Source if the type includes a local user. Privileges of the user in the Business Intelligence environment may be determined based at least partially on the determined local identifier. In some implementations, one or more new security principals may be defined to have access to the business intelligence environment. Defining a new user may include determining whether the new user is a local user, and authentication of the new user independent of an external security source may be allowed if the new user is a local user. Defining a new user may include allowing authentication of the new user through the external security source if the new user is not a local user, and generating a new local identifier associated with the external security source if the new user is not a local user.

In various implementations, a request from a first user for access, as a second user, to a business intelligence environment may be received. The first user may provide first user identification information associated with the first user and second user identification information associated with the second user. The first user identification information may include a set of two or more types of user identification information and the second user identification information includes a subset of the types of user identification information in the provided first user identification information. A determination may be made whether to allow the first user to access the business intelligence environment as the second user based at least partially on an access listing. The access listing may include user identification information for one or more authorized users authorized to access the business intelligence environment as another user, and at least one of user identities, user identification information, roles, or groups of users on which one or more of the authorized users is authorized to request access. A local identifier of the second user may be determined if the determination is made to allow the first user access as the second user, and the first user may be allowed access to the business intelligence environment as the second user, if the determination is made to allow the access. The access in the business intelligence environment may be enabled based on the determined local identifier of the second user.

Implementations may include one or more of the following features. An audit trail of access by the first user as the second user when the requested access is allowed and/or attempted access when the requested access is denied may be generated and/or stored. In some implementations, the audit trail may be retrieved, presented, and alteration of at least a portion of the audit trail may be restricted. Determining a local identifier of a second user may be at least partially based on a mapping retrieved through a Security Migration System Namespace. The retrieved mapping may include local identifier(s) generated by a different Security Namespace. In some implementations, the first user identification information may be authenticated and the second user identification may be validated through a Security Migration System Namespace. The Security Migration System Namespace may authenticate based at least partially on a type of user. Authenticating the first user identification information based at least partially on the type of user may include: determining the type of user based at least partially on the provided first user identification information; authenticating the provided first user identification information independently of an External Security Source if the user type comprises a local user; and if the user type does not comprises a local user, delegating the authentication of the first user identification information to the external security source. In some implementations, validating the second user identification information based at least partially on the type of user includes: determining the type of user based at least partially on the provided second user identification information; validating the provided second user identification information independently of an External Security Source if the user type comprises a local user; and if the user type does not comprises a local user, delegating the validation of the second user identification information to the external security source.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of the present disclosure and its features, reference is now made to the following description, taken in conjunction with the accompanying drawings, in which.

Like reference symbols in the various drawings indicate like elements.

DETAILED DESCRIPTION

Business intelligence (BI) software, such as IBM Cognos (commercially available from IBM, New York United States) and SAP Business Objects (commercially available from SAP AG, Waldorf, Germany), is used by companies to identify, extract and analyze data from business operations. For example, BI software may monitor data accumulated by the company and process the data to produce results such as reports, dashboards, graphs, charts or other visualizations in order to facilitate, increase efficiency of, reduce costs, and/or improve business operations. The BI software may include analytical processing, data mining, benchmarking, predictive analytics and/or forecasting capabilities. BI software may be installed and configured on one or more computers to provide a Business Intelligence (BI) environment.

A Security Migration System (SMS) may be utilized in a BI environment to manage access in the BI environment. When access to external security source(s) are to be restricted, when an administrator prefers to utilize a different authentication and/or validation process, and/or when external security source(s) and/or namespace(s) are replaced, the SMS may be utilized. In some implementations, the SMS may be utilized, for example, when an external security source is replaced with a different external security source, when management of security principals from more than one external security sources are merged, and/or for access independent of a specific external security source and/or namespace. The SMS may manage the authentication and/or validation of security principals in a BI environment and/or authentication (e.g., directly or indirectly, by delegating) of users.

Figure 1A:
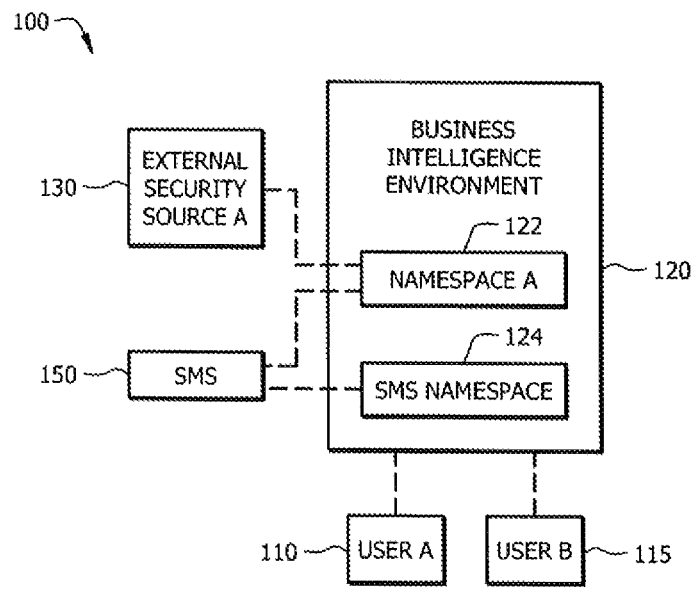
FIG. 1A illustrates an implementation of an example system.
Figure 1B:
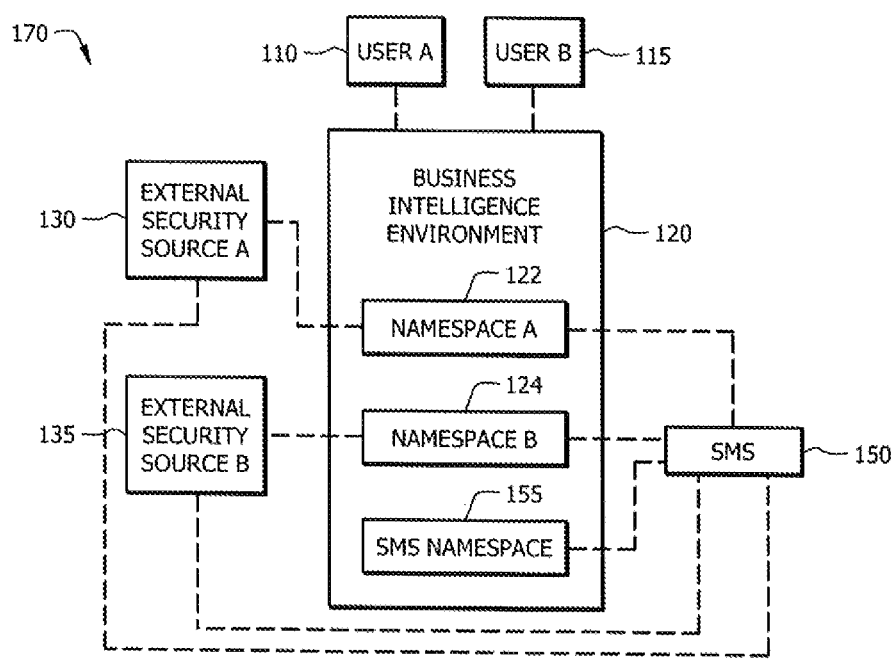
FIG. 1B illustrates an implementation of an example system.
Figure 1C:
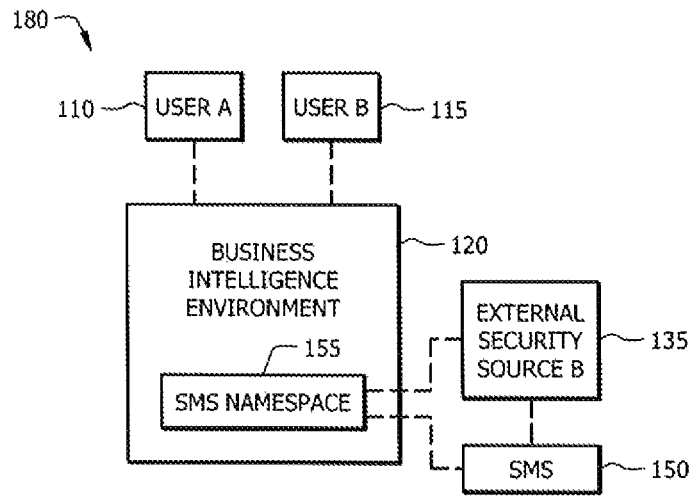
FIG. 1C illustrates an implementation of an example system.

FIG. 1A illustrates an implementation of an example system 100 that includes a portion of a BI environment. The BI environment includes one external security source, External Security Source A 130, and an associated namespace, namespace A 122. If the external security source and/or associated namespace are to be replaced, repaired, and/or otherwise removed from the system (e.g., temporarily and/or permanently), SMS may be utilized to migrate authentication and/or validation services to the SMS and/or an external security source (e.g., External Security Source B 135), as illustrated in FIG. 1C, in which an implementation of an example system is illustrated. As illustrated, the authentication and/or validation services performed by one or more of the external security sources and associated namespaces may be performed by the SMS and/or SMS namespace, and/or the authentication may be delegated to an external security source. FIG. 1B illustrates an implementation of an example system 170 that includes a portion of a BI environment. The BI environment includes two external security sources, External Security Source A 130 and External Security Source B 135 and two associated namespaces, namespace A 122 and namespace B 124. If one or more of the external security sources and/or associated namespaces are to be replaced, repaired and/or otherwise removed from the system (e.g., temporarily and/or permanently), the SMS may be utilized to migrate authentication and/or validation services to the SMS and/or an external security source, as illustrated in FIG. 1C.

As illustrated in FIGS. 1A-1C, users, such as User A 110 and User B 115 may utilize a user device, such as a computer, to access the BI environment 120 (e.g., a server that includes at least a portion of the BI environment). For example, User A 110 may be communicably coupled to the BI server 120 through the Internet and User B 115 may be communicably coupled to the BI server through a LAN.

Users may log into the BI environment 120 by providing user identification information (e.g., user identification name; user name, user code, biometric identifiers, security tokens, credentials, security image, password; and/or how the user would like to gain access, such as based on user identity, user role, and/or user group). For example, the BI environment may receive a first user identification information from user A (e.g., user A and/or user A's computer) and a second user identification information from user B. The provided user identification information may include one or more types of user identification information, such as user name, password, security image, one or more types of credentials, etc.

The BI environment 120 may delegate authentication and/or validation of the user identification information. The BI environment 120 may be coupled to one or more external security sources (e.g., Active Directory and/or LDAP). As illustrated, the BI environment 120 may be coupled (e.g., temporarily or for a time period) to External Security Source A 130 and/or External Security Source B 135. The BI server 120 may communicate with External Security Source A 130 and/or External Security Source B 135 to authenticate a user identity via a namespace.

A namespace (e.g., namespace A 122 and/or namespace B 124) may be a portion of the BI environment 120. The namespace may be a module in the memory of the BI environment 120 adapted to delegate authentication of users and/or generate local identifiers for use in the BI environment. A namespace, such as Namespace A 122, may receive a request for validation and/or authentication of a user seeking access to the BI environment 120 from the BI environment. For example, namespace A may receive, from the BI environment 120, an authentication request including first user identification information from user A and delegate the authentication of the first user identification information to External Security Source A. The External Security Source A may determine whether to authenticate the identity of user A based at least partially on the provided first user identification information.

If the External Security Source A determines that the first user identification information is valid (e.g., by comparing the provided first user identification information to a table of associated user identification names and passwords), then the External Security Source A may generate an authentication signal for transmission to the Namespace A. The authentication signal may indicate that the first user identification information is valid and/or provide other information (e.g., external security source user identification information, security principal information associated with a user). If the External Security Source A determines that the first user identification information is not valid, then the External Security Source A may generate an authentication signal, indicating that the provided first user identification information is invalid, for transmission to Namespace A. In FIG. 1B, where two external security sources, External Security Source A 130 and External Security Source B 135 are present, External Security Source B 135 may interact with the BI environment and/or Namespace B 124 in a similar manner. When two external security sources are present in a BI environment, the BI environment may delegate authentication and/or validation services based on the user identification information provided by the user and/or the identity of the user (e.g., employees in a region of a company may be assigned a specific external security source that provides authentication services).

The namespace may receive results of the determination of whether the provided user identification information is valid from the External Security Source and generate a local identifier. For example, when Namespace A 122 delegates authentication of the user to the coupled External Security Source A 130, the External Security Source A may authenticate and/or validate the user. The Namespace A 122 may generate and/or determine a local identifier associated with a validated user. The Namespace A 122 may transmit the generated local identifier to the BI environment. When Namespace B 124 delegates authentication of the user to the coupled External Security Source A 130, the External Security Source A may authenticate and/or validate the user. The Namespace A 122 may generate and/or determine a local identifier associated with a validated user. A namespace may generate the local identifiers in a format and/or may be based on information provided by the associated External Security Source. The Namespace A 122 may transmit the generated local identifier to the BI environment.

Since user identification, such as a user name and/or password, may or may not uniquely identify a user across multiple external security sources, local identifiers may be utilized in the BI environment to uniquely identify security principals, such as users (e.g., defined in an external security source and/or the SMS), roles, and/or groups. For example, a company may include two John Smiths, one in a first region and a second in a second region. The two users may both have a user name of JSmith (e.g., an each defined in a different external security sources), but the BI environment may distinguish access between the two users since the BI environment utilizes unique local identifiers rather than the user identification information.

A namespace may generate local identifiers to uniquely identify security principals (users, groups, and/or roles) from an external security source to the BI environment. Access to resources and/or capabilities in the BI environment may be controlled by security policies, which reference the local identifiers. For example, Namespace A 122 may expose a group named "Dallas Branch," a group named "New York Branch," and a role named "Power Users". BI environment 120 may contain a Report named "Dallas Forecast." A security policy may be defined for the "Dallas Forecast" report which grants any members of the "Dallas Branch" read, write and execute privileges to the report, grants members of the "New York Branch" read and execute privileges to the report, and grants members of the "Power Users" role read, write, execute and "set policy" privileges to the report. The local identifiers, which uniquely identify each involved security principal, may be embedded the security policy.

Numerous aspects of the BI environment's content and configuration may contain references to one or more local identifiers in order to relate the aspect to one or more security principals. Common examples include security policies which control access to resources and/or capabilities in the BI environment, memberships, ownership relations, recipient relations, model filters, etc.

A namespace may be associated with a predetermined External Security Source. For example, Namespace A 122 may be associated with External Security Source A 130 and Namespace B 124 may be associated with External Security Source B 135. The namespace may generate the local identifiers in a format based at least partially on the External Security Source to which the namespace is associated, the security principals defined within the External Security Source, and/or the configuration parameters of the namespace. For example, Namespace A may generate local identifiers in a first format when associated with External Security Source A. Namespace B may generate a local identifier in a second format when associated with External Security Source B. Changes to the namespace configuration or the associated external security source may cause the generated local identifiers to change. For example, if Namespace A 122 was reconfigured to point at External Security Source B 124, then the local identifiers generated by Namespace A may be affected (in many cases, the local identifiers generated by Namespace A will all change). Since numerous aspects of the content and configuration of the BI environment may contain references to previously generated local identifiers, this change can create significant problems in the BI environment.

In some implementations, a Security Migration System (SMS) 150 may be coupled to the BI server 120. The SMS 150 may be utilized to manage access to the BI server 120. The SMS 150 may be a module stored on the BI server and/or in a memory or server coupled to the BI environment. The SMS 150 module may, for example: generate a mapping of local identifiers, generate mapping such that access to the BI environment may be enabled independently of the namespace that previously generated the local identifier, enable access based on the generated mapping, identify candidate improvements, and/or allow users access to the BI environment as other users.

The SMS may be utilized to manage access to the BI server for a variety of reasons. In some implementations, an administrator of a BI server 120 may switch external security service from External Security Source A 130 to External Security Source B 135. For example, companies may employ more than one external security source (e.g., each region may have separate external security sources, a division may have a separate external security source than another division(s), and/or companies undergoing a merger may have separate authentication providers). The SMS may be utilized to transfer or merge the validation services of more than one external security source to an External Security Source, such as External Security Source B, and/or the SMS (e.g., the SMS and/or SMS namespace). In some implementations, a company may obtain a new external security source and the SMS may be utilized to transfer at least a portion of the validation services of one or more external security sources to the new external security source and/or the SMS. In some implementations, an external security source may need maintenance and/or repair, and the SMS may be utilized to transfer at least a portion of the validation services of the external security source to the SMS.

Due to the nature of BI environment namespaces and associated external security sources, merely copying security principals from one external security source to another, such as from External Security Source A 130 to External Security Source B 135, and then attempting to expose the copied principals through a current or existing namespace may create issues in the BI environment. Since the local identifiers generated by the namespace are often a function of the namespace configuration, the associated external security source, and/or the details of the security principals in the external security source, attempting to reconfigure an existing namespace to point at a different external security source often causes the generated local identifiers to change, potentially invalidating the existing references to previously generated local identifiers in the BI Environment's content or configuration. For example, although the user, such as a first user, would be able to login through External Security Source B, the namespace associated with External Security Source B would generate a new local identifier. The new local identifier may be different (e.g., format, content, and/or communication protocols) from the local identifier previously associated with the first user (e.g., since the previously local identifier was generated by the namespace associated with External Security Source A). Although the first user may have access to the BI environment enabled based on the new local identifier, the first user would not be able to access the functions allowed in the BI environment based on the previous local identifier (e.g., since the BI environment references the local identifier and does not correlate the previous local identifier and the new local identifier).

For example, a first user, with a logon of "jsmith" and a password of "secret" may be defined in External Security Source A 130. This first user may authenticate to the BI environment through Namespace A 122 by supplying the correct logon and password ("jsmith" and "secret", respectively). Namespace A may validate the supplied credentials with External Security Source A, and then may signal to the BI Environment a successful authentication, along with a generated local identifier CAMID("NamespaceA:u:12345") which is used to uniquely identify the first user in the BI environment. Each time the first user authenticates to the BI Environment through Namespace A, the first user will be identified to the BI Environment with the same local identifier (CAMID("NamespaceA:u:12345")). This first user may have been previously granted access to various resources and capabilities in the BI environment, for example the first user may have been granted read and execute permission to the BI report "Dallas Revenue." This permission is stored in the content and/or configuration of the BI environment and references the first user's local identifier CAMID("NamespaceA:u:12345"). If the first user is then copied from External Security Source A 130 to a second user defined in External Security Source B 135, and if the second user possesses the same logon ("jsmith") and the same password ("secret"), and if Namespace A is re-configured to point at External Security Source B, then the second user will still be able to authenticate to the BI environment through Namespace A (by using a logon of "jsmith" and a password of "secret"), but will likely be identified to the BI Environment with a different local identifier, e.g., CAMID("NamespaceA:u:ABFF12"), meaning the previously configured permission object would not reference the second user.

In large-scale BI environments, there may be hundreds of thousands of local identifiers that are referenced in the content or configuration of the BI environment. A change to the namespace or an underlying security source may cause subsequently generated local identifiers to be different than previously generated local identifiers. Mapping, finding and correcting the previously generated local identifiers to their new values may be cumbersome, expensive, error prone (e.g., since each reference must be identified and replaced), and/or time consuming.

Thus, the SMS 150 may be utilized. The SMS 150 may provide an SMS namespace 155 in the BI Environment 120. The SMS namespace 155 may identify security principals via previously generated local identifiers independently of a specific external security source and/or associated namespace. For example, SMS 150 may authenticate users independently of the External Security Source A 130 and/or identify security principals to the BI environment using local identifiers previously generated by Namespace A 122, independent of Namespace A and/or the External Security Source A. The SMS namespace may self authenticate users and/or delegate authentication of user(s) to another external security source, such as External Security Source B 135.

The SMS may operate by communicating with the BI environment 120 and the External Security Source(s) 130, 135 to facilitate a transition by the BI environment from authentication against External Security Source A to authentication against External Security Source B, by producing a mapping that correlates previously generated local identifiers with security principals in External Security Source A and/or External Security Source B, and/or delegating validation of one or more of the security principals to External Security Source B 135 or the SMS 150. Thus, once the SMS generates a mapping, then the SMS may independently validate user identification information (e.g., by delegating the validation to a coupled external security source and/or by independently authenticating the user identification information). In some implementations, access to the External Security Source A and/or Namespace A may be restricted (e.g., disconnected from the BI environment 120), and the generated mapping may be utilized to provide access to the BI environment 120 through the SMS namespace 155 using the previously generated local identifiers.

In some implementations, an administrator of a BI environment 120 may utilize the SMS to facilitate maintenance on External Security Source A 130. For example, the SMS may generate a mapping of local identifiers and provide access to the BI environment 120 based at least partially on the local identifiers previously associated with Namespace A 122 and/or External Security Source A 130 while the External security source A is disconnected from the BI server 120, altered (e.g., maintained and/or repairs are performed) and/or taken offline.

In some implementations, a system may include two external security sources, such as External Security Source A 130 and External Security Source B 135. For example, when two companies merge, they may include different external security sources and an administrator of the BI environment may merge the different external security sources. In some implementations, a company may include divisions and/or groups (e.g., regions, business groups, etc.) that may utilize different external security sources. An administrator of the BI server may merge one or more of the different external security sources and/or transfer responsibility to one of the external security sources. The SMS 150 may be utilized to enable independent access (e.g., access that does not require access to the namespace that generated the local identifier and/or the associated external security source) in the BI environment based on local identifiers generated by various namespaces associated with the different external security sources. Thus, the SMS 150 may be utilized to enable access in the BI environment (e.g., based at least partially on local identifiers) independent of the external security source in which the associated security principals were defined.

Although FIG. 1 illustrates a specific implementation of a system, various other implementations may be utilized. For example, a system may include three or more external security sources. In some implementations, the SMS may be utilized to maintain functionality (e.g., in the BI environment for a user) based on local identifiers while replacing obsolete, redundant, and/or implementing business policies that include changes in external security sources.

In various implementations, access to local identifiers and thus the BI environment based on the local identifiers may be obtained independent of authentication through a predetermined External Security Source and its associated namespace, when using the SMS. In some implementations, access to an External Security source coupled to the BI environment may be restricted (e.g., for maintenance, for merger with another external security source, replacement, and/or to remove the external security source). For example, an external security source may be replaced by a different external security source (e.g., which utilizes different types of local identifiers). In some implementations, two or more external security sources may be merged (e.g., into a new external security source, into one of the external security sources to be merged, and/or into the SMS and SMS namespace). In some implementations, a BI administrator may prefer to stop using a specific namespace and/or external security source and utilize the SMS as a bypass. In some implementations, a reduced number of external security sources and/or replacing one or more namespaces with a namespace that can maintain previously generated local identifiers may facilitate management of resources of a company.

Figure 2:
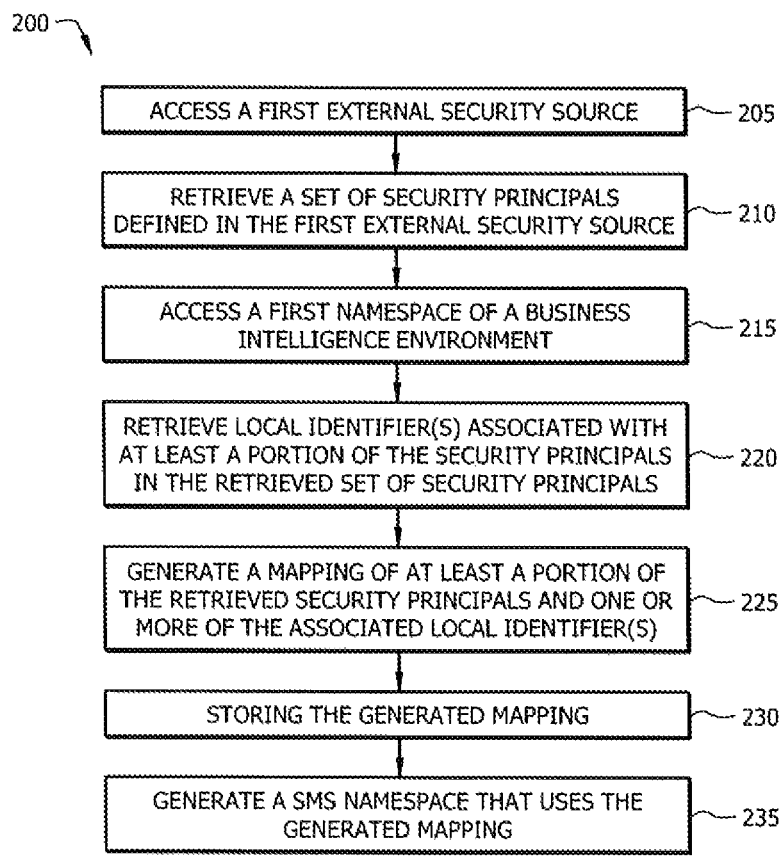
FIG. 2 illustrates an implementation of an example process for generating a mapping.

The SMS may provide access to local identifiers, at least partially based on a mapping, independent of the namespace and/or external security source associated with the generation of the local identifiers and/or associated with the definition of associated security principals. The mapping may be generated by the SMS and may be utilized by an SMS namespace of the BI environment and generated by the SMS. FIG. 2 illustrates an implementation of an example process 200 for generating a mapping. The SMS may generate various user interfaces (e.g., graphical user interfaces) to receive and/or direct the input of information utilized to generate a mapping.

A first External Security Source may be accessed (operation 205). The first external security source may authenticate and/or authorize a set of security principals, such as users, for access to the BI environment (e.g., through a configured namespace in the BI environment). For example, the first external security source may include a listing of user identification information such that when a user provides a user identification information, such as a user name and/or password, the external security source may access the listing to determine if the provided user identification information is valid. Thus, the identity of the user may be validated based on the provided user identification information. A user may not be validated if the provided user identification information is not the same as the user identification information in the listing.

In some implementations, the SMS may generate an interface adapted to receive, for example, communication protocols (e.g., access information) from a user, such as a BI administrator. The SMS may utilize the information provided via the interface to access the first external security source. The External Security Source may be coupled to the BI environment and/or the SMS.

A set of security principals defined in the First External Security Source may be retrieved (operation 210). For example, the first external security source may be accessed to provide information stored in the first external security source, such as a listing of security principles (e.g., users, roles, and/or groups), listing of user identification information, external security source identification (e.g., a unique identifier the external security source utilizes to identify a valid user), communication protocols, and/or other information. The set of security principals may have been defined in the first external security source. The SMS may access the First External Security Source based on the information provided via an interface of the SMS and retrieve the set of security principles and/or other information stored in the first external security source, in some implementations.

A first security namespace of the BI environment may be accessed (operation 215). For example, the SMS may access the first security namespace via communication protocols provided by a user, such as a BI administrator, via a user interface. The first security namespace may be a portion (e.g., a module) of the BI environment that is coupled to and/or associated with the first external security source. The first security namespace may expose the security principals stored in the first external security source. The first security namespace may delegate authentication and/or validation of user identification information from requests for access to the BI environment to the First external security source. The first security namespace of the BI environment may be adapted to communicate with a specific external security source, such as the first external security source, and may be inhibited from successfully communicating with other external security sources (e.g., incompatible formats and/or incompatible communication protocols). The first security namespace may generate local identifiers based on a first format. For example, the first security namespace may generate local identifiers based on information from the external security source (e.g., external security source identification, format guidelines provided by the external security source, and/or valid user identification). A namespace may generate local identifiers in various formats based on the external security source to which the namespace is associated. In some implementations, the namespace may generate local identifiers in a first format when coupled to a first external security source, and regenerate the previously generated local identifiers (e.g., in a second format and/or as a new local identifier) if coupled to a second external security source.

Local identifiers associated with at least a portion of the security principals in the retrieved set of security principals may be retrieved (operation 220). The SMS may retrieve a portion of the local identifiers associated with one or more of the retrieved security principals. For example, the SMS may retrieve local identifiers for a subset (e.g., current users, predetermined users, and/or locals users) of the security principals retrieved from the external security source. A local identifier uniquely identifies a specific security principal.

A mapping of at least a portion of the retrieved security principals and one or more of the associated local identifiers may be generated (operation 225). For example, the SMS may generate the mapping of associations of local identifiers and their associated security principals. The mapping may allow previously generated local identifiers to be maintained independent of whether the SMS namespace is coupled to a specific external security source.

The generated mapping may be stored (operation 230). For example, the mapping may be stored in a memory coupled to the SMS namespace, the SMS, and/or the BI environment.

A SMS namespace that uses the generated mapping may be provided (operation 235). For example, the SMS may provide an SMS namespace. The SMS namespace may be provided in the BI environment. The SMS namespace may replace (e.g., replace the functions of) the first security namespace. The SMS namespace may be provided such that security principals are identified to the BI environment using previously generated local identifiers (e.g., local identifiers previously generated by the first security namespace) even when authentication is no longer validated by the first external security source. For example, if the connectivity to the first external security source and/or first security namespace is restricted, supplemented, and/or if a BI administrator prefers to control access through the SMS, the SMS namespace may enable access to the BI environment using an alternative means of authentication, and may identify security principals to the BI environment by using previously generated local identifiers (e.g., independently and/or without utilizing the first external namespace and/or first external security source).

In some implementations, various aspects in the BI environment's content and configuration, including privileges, and/or functions may be enabled based at least partially on the local identifier associated with the first user. For example, the functions and/or privileges for a first user may be determined based on the determined local identifier independently of how authentication of a user identity (e.g., through provided user identification information) is allowed by the BI environment. Thus, the references to a local identifier may be maintained and/or may not be altered in the BI environment (e.g., content store references) even when a new external security source is utilized to provide authentication for access.

Maintaining a previously generated local identifier may enhance user experience (e.g., by maintaining preferences), maintain functionality, and/or ease transitions from one external security source to another external security source and/or the SMS. For example, in some implementations, since the local identifier enables various aspects in the BI environment, by utilizing a previously generated local identifier rather than generating a new local identifier, a user's preferences may be retained (e.g., same workspace layout, same color scheme, etc.); the user's personal BI content may be retained (e.g., each user gets a "My Folders" area where they can store their own BI content and this information may be retained since it is associated with the local identifier that has been retained through the generated mapping); the user may maintain ownership of the same objects; the user may still be a recipient on any scheduled email deliveries they had; the user may still be the "contact" for any BI content they were listed as the contact on before; security policies which referenced the user will be maintained (e.g., they may still reference the same user), etc.

Process 200 may be implemented by various systems, such as systems 100, 170, and/or 180. In addition, various operations may be added, deleted, and/or modified. For example, the provided namespace may retrieve the generated mapping and determine local identifiers associated with security principals based on the generated mapping. In some implementations, the First Security Namespace may be replaced with the Security Migration System Namespace.

In some implementations, access to the First External Security Source may be restricted. For example, if authentication responsibilities are being migrated from a first external security source to a second external security source, the first external security source may be disconnected (e.g., uncoupled) from the BI environment. In some implementations, the first external security source may be temporarily uncoupled from the BI environment for maintenance, troubleshooting, etc. The Security Migration System Namespace may provide access to the BI Environment when access to the First External Security Source is restricted. For example, the SMS Namespace may replace the First Namespace. The SMS Namespace may retrieve the local identifiers that were generated by the first namespace for security principals validated by the First External Security Source.

The SMS Namespace may self-authenticate the security principals and/or delegate the authentication of a security principal to a different External Security Source. In some implementations, the SMS may validate the provided user identification credentials itself (e.g., by consulting its memory/database). For example, the SMS may store a hash of a password and compare a hash of the supplied password to the stored hash to determine whether to validate a user.

In some implementations, access in the BI environment may be based on the first local identifier, which is generated by a first security namespace associated with a first external security source, even though a user provides user identification associated with a second external security source. The mapping may be utilized to provide the first local identifier since the mapping may include associations between local identifiers and user identification for more than one external security source, in some implementations. Thus, the change in external security source may not affect the use of local identifiers in the BI environment (e.g., references to the local identifiers may not be altered in the content store to the second format of local identifiers).

In some implementations, the SMS and/or SMS namespace may self-validate at least a portion of the security principals based on the generated mapping. For example, the generated mapping may include valid user identification information for security principals. The SMS namespace and/or SMS may compare provided user identification information with user identification information in the generated mapping to determine whether to authenticate the security principal. If the user identification for a security principal is the same as the user identification information for the security principal in the generated mapping the user may be successfully authenticated, and/or authorized to access the BI environment. If the user identification for a security principal is not the same as the user identification information for the security principal in the generated mapping the user may not be authenticated. A validation or authentication signal may be transmitted from the SMS to the SMS namespace and/or BI environment and/or from the SMS namespace to the BI environment indicating that the security principal has been validated or not validated.

In some implementations, the SMS namespace may delegate the authentication of a security principal to an external security source. For example, the BI environment may be coupled to a second external security source, as illustrated in FIGS. 1B and 1C. The SMS namespace may receive a request to authenticate a user and determine whether to delegate the authentication of the user to the second external security source. For example, the SMS namespace may include a set of rules that indicate users for which to delegate authentication and/or a set of rules that indicate users to self-authenticate. For example, a determination of whether to delegate the authentication of a user may be based on the type of user. When a user is a local user (e.g., a user that is not designated to be authenticated by predetermined External Security Source(s)), the user may be self-authenticated by the SMS. When the security principal is not a local user, the authentication of the security principal may be delegated to an external security source. For example, a company may control user authentication at a centralized external security source but may utilize local principals as test users, test groups, etc. The authentication of the test users may be managed locally at the SMS level, in some implementations.

In some implementations, the SMS Namespace may replace the First Security Namespace and provide access to the Business Intelligence Environment using one or more of the unique local identifiers generated by the First Security Namespace. Thus, the SMS Namespace may enable access to the BI environment independently of the first security namespace. In some implementations, the SMS Namespace may provide access to the BI Environment using one or more of the unique local identifiers generated by the First Security Namespace when access to the First Security Namespace is restricted.

In some implementations, authentication may be allowed based at least partially using the Security Migration System Namespace. The generated mapping may be utilized to identify security principals to the Business Intelligence environment using one or more of the previously generated local identifiers. Since local identifiers are generated by a namespace associated with a specific external security source, and resources and/or capabilities in the BI environment may be secured based on the local identifiers, when access to the namespace or associated external security source is restricted or inhibited (e.g., by a BI administrator), access to the secured resources and/or capabilities may be affected. By utilizing the SMS Namespace to identify security principals using the previously generated local identifiers, access to the secure resources and/or capabilities in the BI environment may be maintained. Thus, the BI environment may not need to be modified to accommodate changes in namespaces and/or external security sources, when the SMS is utilized and security principals are exposed to the BI environment using the previously generated local identifiers. In addition, users may maintain a level of access to resources and/or capabilities that were based on the previously generated local identifiers, when the generated mapping is utilized to provide access to the previously generated local identifiers (e.g., since references in the BI environment may not need to be altered to replace a previously generated local identifier associated with a newly generated local identifier).

In some implementations, new security principals may be added to the system. The new security principals may be added to the SMS to be self-authenticated and to allow the SMS to generate a local identifier to identify each new security principal in the BI environment. In some implementations, a second external security source may be coupled to the system. The second security source may receive delegated authentication requests from the SMS. In some implementations, new users may be added directly using the second external security source. The Security Migration System Namespace may delegate validation of at least a portion of the security principals in the generated mapping to the Second External Security Source. In some implementations, one or more matching security principals may be identified based on a determination of whether one or more of the security principals in the generated mapping are the same as one or more of the additional security principals, and additional association(s) may be generated in the mapping. The additional association(s) may include associations between one or more of the local identifiers in the mapping that are associated with one or more of the matching security principals with the additional security principal such that validation of a matching security principal may be delegated to SMS and/or the Second External Security Source and such that access may be enabled based on the local identifier from the mapping.

In some implementations, authentication services for the BI environment may be migrated from a first external security source to a second external security source. The SMS may generate a mapping of associations between local identifiers generated by a first namespace associated with security principals in the first external security source and security principal identification information. The SMS may generate the mapping based on information retrieved from the second external security source in addition to the first external security source, and the first namespace in some implementations. For example, the SMS may retrieve second external security source information (e.g., second set of security principals and/or second security source identification information) from the second external security source. The SMS may determine whether one or more of the security principals retrieved from the second external security source are the same as security principals retrieved from the first external security source (e.g., by comparing security principal identification information, manual administrator mapping, processing of an external mapping file or database table, and/or by other means). The SMS may automatically correlate one or more of the same security principals, in some implementations (e.g., correlate security principals from the first security source with security principals from the second security source). The SMS may automatically suggest possible security principal correlations for confirmation by an administrator. At least a portion of the security principals in the second set of security principals may then be associated with local identifiers retrieved from a first namespace associated with security principals in the first external security source. Thus, the SMS and/or SMS namespace, through the generated mapping, may allow security principals in the second set of principals to be authenticated to the BI environment by the second external security source, and the SMS namespace may identify a security principal from the second set using the previously generated (e.g., by the first security namespace) local identifier associated with the principal from the second set.

In some implementations, the SMS may identify candidate improvements to the external security sources, the security policies which control access to resources and/or capabilities in the BI environment, or various other aspects of security in relation to the BI environment. For example, data such as the generated mapping, security information (roles and/or groups to which the security principal belongs and/or other security information), and/or security policies, which control access to resources and/or capabilities in the BI environment, may be analyzed. The data may include security and/or usage information stored in and/or generated by in the SMS, external security source(s), namespace(s), applications security by the SMS, historical usage statistics and/or audit databases, and/or other applications and/or memories coupled to the SMS and/or BI environment. Candidate improvements may be identified at least partially based on the analysis. For example, the analysis of the generated mapping may identify one or more differences in access, access levels, roles, groups, associated groups, and/or privilege for security principal such as a user, and identifying the candidate improvements may include the difference(s). For example, changes in role may be flagged and/or otherwise designated (e.g., an entry level user now has high level clearance). The analysis may include determining access not utilized by security principals such that an improvement based on revising access may be identified. In some implementations, the SMS may analyze security and usage information stored within or generated by SMS, external security sources, applications secured by SMS and/or other applications or databases in order to provide automated guidance to administrators on how to improve, maintain or update the principals, memberships and/or other appropriate concepts (e.g., permissions or configurations in those applications which are secured based on SMS security principals). For example, after analysis of this data, the SMS may automatically provide notifications or suggestions to administrators on which accounts could likely be removed; accounts which are involved in suspicious activity (e.g., based on access, changes in roles, etc.); accounts which have experienced a sudden surge in access; groups and/or roles which could likely be removed and/or consolidated; unusual access patterns; and/or other improvements to the configuration in the SMS or associated applications.

In some implementations, an analysis of the generated mapping may indicate that local identifiers associated with the same user may have different access levels. The identified candidate improvements may include the identified difference(s). For example, the candidate improvement may include a flag and/or notation that a user has different access levels and/or roles associated with his/her local identifiers. The identified candidate improvements may be presented to one or more users (e.g., on a presentation device and/or as a report). The SMS may recommend candidate improvements based on the analysis (e.g., reconcile disparities).

Figure 3:
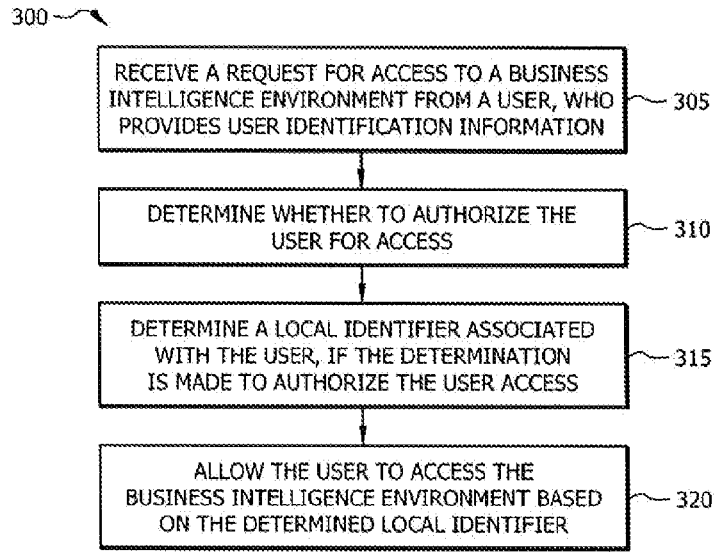
FIG. 3 illustrates an implementation of an example process for allowing access to a BI environment.

FIG. 3 illustrates an implementation of an example process 300 for allowing users access to the BI environment. An authentication request may be received for access to a BI environment from a user, who provides user identification information (operation 305). For example, user identification may include, but is not limited to, a user name, and/or password. The user may provide the user identification information through an interface of the BI environment. For example, the user may log in through a login page generated by the BI environment. The BI environment may transmit a request for authentication of a user to a namespace of the BI environment, such as the SMS namespace.

A determination may be made whether to authorize the user for access (operation 310). For example, the SMS namespace may determine whether to self-authenticate or delegate authentication of a user (e.g., based on a type of user or information stored in the SMS about the identified user). For example, local users may be self-authenticated by the SMS and/or SMS namespace. As another example, an SMS namespace may be configured to self-authenticate a set of security principals listed in a mapping. For example, when the SMS retrieves information from an external security source to generate a mapping, the SMS may retrieve user identification information such that it may self-authenticate users. In some implementations, authentication of a set of security principals may be delegated to an external security source. For example, when an external security source is replaced and/or merged with a different external security source, authentication may be delegated by the SMS namespace to the different external security source. In some implementations, authentication for a first set users may be self-authenticated (e.g., by the SMS namespace and/or the SMS), and authentication for a second set of users may be delegated to an external security source. The SMS may provide administrators with flexibility in regard to the authentication policy for each user.

A local identifier associated with the user may be determined, if the determination is made to authorize the user access (operation 315). For example, the SMS namespace may retrieve a mapping that includes associations of security principals and previously generated local identifiers. The mapping may allow the SMS namespace to continue to use previously generated local identifiers even when access to the namespace that generated the local identifier is restricted or inhibited (e.g., when access to the external security source associated with the namespace is restricted, when a BI administrator routes authentication away from the namespace or external security source, and/or when a namespace and/or external security source has been disconnected, shutdown and/or replaced).

The user may be identified to the BI environment based on the determined local identifier (operation 320). For example, the BI environment may allow various operations and/or functions based on local identifiers. For example, numerous aspects of the BI environment's content and configuration may reference a local identifier, such as features including resources and/or capabilities in the BI environment that may be secured based on policies which reference the local identifier, etc. By identifying the user to the BI environment using the previously generated local identifier, independent of the namespace that generated the local identifier and/or the external security source associated with the namespace, the access to the BI environment may maintained based on the local identifier and mitigate the need to modify references in the BI environment to the local identifier. For example, without the SMS namespace, when access to a namespace and/or associated external security source is inhibited and/or restricted, references to local identifiers linked generated by the namespace become unusable (e.g., access may not be enabled based on these local identifiers). Without the SMS namespace, if a security principal is transitioned from a first external security source to a second external security source, since new namespaces and/or new external security sources result in new local identifiers which do not match the previously generated local identifiers, the references to the previously generated local identifier which identifies the transitioned security principal would need to be altered in the BI environment in order to maintain the same level of access and/or the same user experience in the BI environment for the transitioned security principal. By utilizing the SMS and/or the SMS namespace, modification of the BI environment is mitigated since transitioned security principals can be identified using previously generated local identifiers without direct access to the namespace that generated the local identifier.

Process 300 may be implemented by various systems, such as systems 100, 170, and/or 180. One or more operations of process 300 may be modified to include one or more operations of other described processes, such as those described in process 200. In addition, various operations may be added, deleted, and/or modified. For example, access may be allowed for a security principal other than a user, for example access may be allowed for a group. The user identification information may include an indication of the type of security principal as which the user would like to gain access.

Figure 4:
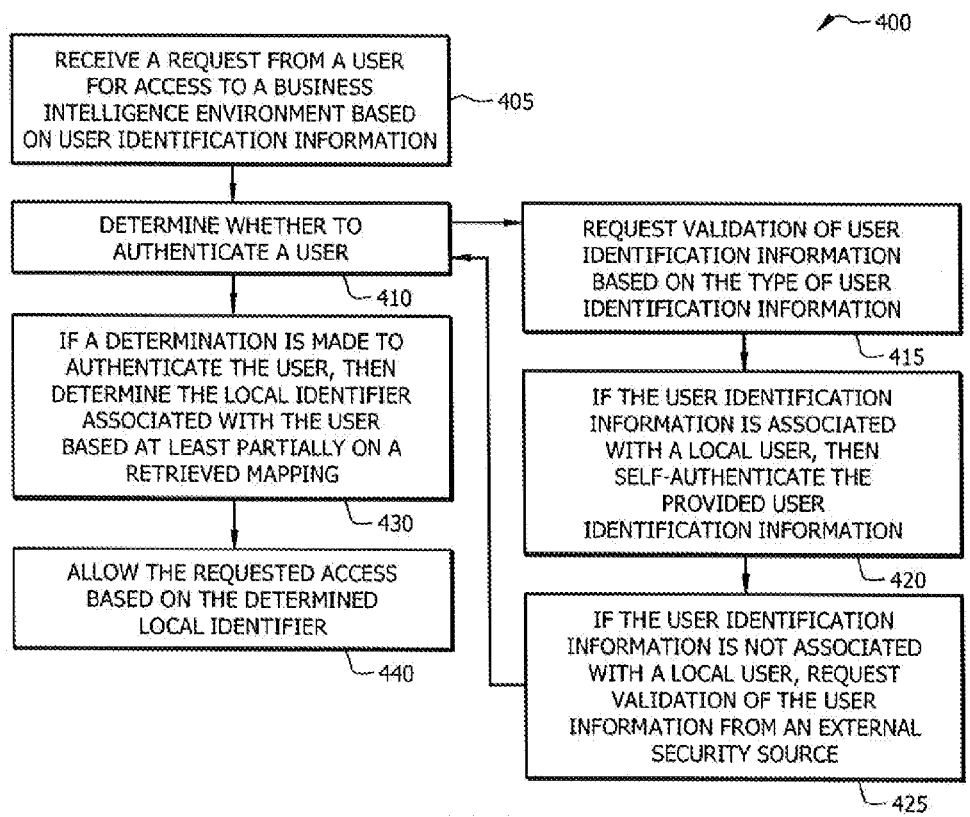
FIG. 4 illustrates an implementation of an example process for allowing access to a BI environment.

FIG. 4 illustrates an implementation of an example process 400 for allowing users access to the BI environment. A request may be received from a user for access to a BI environment based on user identification information (operation 405). The user identification information may include a user name, a password, a token, and/or some other form of information supplied by the user and/or the user's computing environment.

A determination may be made whether to authenticate a user (operation 410). The SMS namespace may receive the request for authentication of a user from the BI environment. The SMS namespace may determine whether to self-authenticate a user and/or delegate authentication of the user. Validation of user identification information based on the type of user identification information may be requested (operation 415). For example, a user may be a local user, a user in a predetermined set (e.g., set to self-authentication, set to delegate authentication, set of new users, set of previous users, set of users in generated mapping). In some implementations, a type of user, such as a local user, may have a local identifier that is identifiable as a local user (e.g., in a listing of local users, a format used for local users, and/or an identifier in the local identifier that denotes a local user).

If the user identification information is associated with a local user, then the provided user identification information may be self-authenticated (operation 420). A local user may be a user that is not included in a set of security principals of an external security source coupled to the SMS namespace and/or BI environment. For example, a local user could be a test user. When user identification information is self-authenticated, the mapping generated by the SMS may be retrieved. The SMS and/or SMS namespace may compare the user identification information in the mapping with user identification information provided by the user to determine if the provided user identification information is sufficient to allow a successful authentication. If the provided user identification information is determined sufficient, then the user may be validated using the mapping and the SMS namespace may generate a signal to the BI environment that indicates the user is validated.

If the user identification information is not associated with a local user, validation of the user identification information from an external security source may be requested (operation 425). For example, an external security source may be coupled to the BI environment (e.g., through a namespace coupled to the external security source and/or though the SMS namespace). The SMS namespace may delegate authentication to the external security source and/or to the namespace associated with the external security source.

If a determination is made to allow the authentication attempt of the user, then the local identifier associated with the user may be determined based at least partially on the retrieved mapping (operation 430). For example, a mapping of associations of previously generated local identifiers (e.g., local identifiers generated by a namespace other than the SMS namespace) and user identities and/or user identification information may be retrieved. The user identification information provided by the user may be utilized to determine the unique local identifier associated with the validated user identification information. By utilizing the mapping retrieved by the SMS namespace, a specific local identifier may be utilized to provide access to the BI environment independent of which external security source is utilized, if at all, to provide authentication of a user.

The requested access may be enabled based at least partially on the determined local identifier (operation 440). The local identifier may be transmitted to the BI environment and functions (e.g., privileges and/or operations) of the BI environment may be enabled based on the local identifier.

Process 400 may be implemented by various systems, such as system 100. One or more operations of process 400 may be modified to include one or more operations of other described processes, such as those described in process 200 and/or 300. In addition, various operations may be added, deleted, and/or modified. For example, in some implementations, a determination may be made whether a user is identified in the generated mapping. In some implementations, when a user is identified in the generated mapping, the mapping will include a rule regarding whether to allow the user to be authenticated by the SMS and/or SMS namespace and/or a rule regarding whether to delegate authentication of the user. Thus, the determination of whether to delegate authentication of the user may be based at least partially on the mapping. In some implementations, when the SMS namespace transmits a signal to the BI environment that indicates that a user has been validated, then the signal may include the local identifier associated with the user.

In some implementations, the request for authentication may be delegated based at least partially on the provided user identification information from the Security Migration System Namespace to an External Security source.

In some implementations, new security principals may be added to the system to have access to the business intelligence environment. The new security principals may be added to the mapping and/or to a second external security source. When new security principals are added to the mapping, the security principals can be authenticated based on the type of user and/or based on the mapping. The SMS namespace may be utilized to generate local identifiers for the new users. The local identifiers generated by the SMS namespace may be added to the mapping, in some implementations. In some implementations, a determination may be made whether the new user is a local user. When the new user is a local user, authentication of the new user may be allowed independent of an external security source. When a new user is not a local user, authentication of the new user may be allowed through an external security source. In some implementations, new local identifiers may be generated for the new users through the external security source if the new user is not a local user.

In some implementations, the SMS may include an ability to support delegated security administration. Security principals exposed through the SMS (e.g., users, groups, and/or roles) may be organized into a hierarchical form in organizational folders. This may allow BI administrators to "farm out" administration of certain areas of the hierarchy, or certain subsets of security principals to other quasi administrator users. For example, a customer may create hierarchical groups or organizational folders, such as:

North America
Canada
United States
East Coast
New York Region
New England Region
Georgia Region
Florida Region
Carolina Region
Virginia/DC Region
Mid West Sales
West Coast Sales, and
Mexico Sales.

An administrator may delegate administration of the New York Region to a non-administrator who worked in the New York region, which enables the region to "manage itself" to a certain extent (e.g., the quasi-administrator, who is embedded in the region, can take on some of the administrative tasks for the security principals in that region). Administrators may still retain full administrative privileges over the region, but they may enable their designated delegate(s) in the region to perform certain administrative operations which are limited to that region (e.g. update the principals associated with the region). The delegated security administration may be implemented on any type of hierarchy (e.g., based on groups, business units, and/or roles).

In some implementations, the SMS may include a pluggable callback pre and/or post authentication hooks that may perform custom actions based on context available in the SMS and/or external sources. For example, a pluggable callback might reflect at least a portion of extensible properties and/or calculations made based on these policies, as BI environment session parameters. In some implementations, a pluggable callback may seek to deny authentication attempts made by the same identity from multiple and/or predetermined IP addresses and/or during a predetermined period of time (e.g. multiple people sharing the same logon).

In some implementations, the SMS may allow configurable authentication flexpoints (e.g., a flexible point in the design that allows for the injection of custom behavior, which may be one of a pre-defined set of behaviors and/or it may be an entirely new behavior that is defined on a case by case basis and configured to be available within the SMS). On a per principal and/or security domain basis, authentication may be determined by a pluggable behavior. For example, the authentication may be performed against a combination of credentials stored in SMS, and credentials may be maintained by one or more external sources, and/or by other appropriate sources.

In some implementations, the SMS may provide a set of flexible credential related behaviors (e.g., in addition to and/or instead of flexpoints for injecting custom behaviors related to credentials). These behaviors may be related to any appropriate aspect of supplied credentials (e.g., the perceived strength of newly supplied passwords, requirements around changing passwords over time, restrictions about new passwords not being derived from historical passwords, password expiration policies, account lock policies, such as account locked after N failed login attempts in a row, account lock notification, policies, etc.)

In some implementations, the SMS may support a configurable notification policy with respect to changes made on security principals, their privileges and/or their level of access in SMS or other related systems. Notifications may also be configured for system wide events like failed login attempts, impersonation events, changes in certain group/role, memberships, etc. Notifications may be include emails, text messages or other notifications targeted at a predetermined set of subscribers. For example, the administrators of a system might choose to be notified proactively if any additional principals are added to system administrator related groups.

In some implementations, the SMS may also support configurable notification policies with respect to the number of principals entitled to a given set of features and/or capabilities in a system secured by the SMS. For example, if a given Customer is licensed for 50 users of Report Studio (e.g., in a BI authoring studio), then the system administrators may want to be notified by SMS if the number of authorized users for the Report Studio capability ever exceeds 50.

In some implementations, the SMS may be able to identify and record at least a portion of the references to security principals exposed by the SMS in external systems secured by the SMS. For example, when the SMS is used in an IBM Cognos Environment, an implementation of a BI environment, the SMS may be able to find, catalog and record all local identifier (e.g., CAMID) references in the IBM Cognos Environment which correspond to selected SMS based principals. This ability may be initiated as a scheduled activity, an on-demand action, and/or triggered by an external event (e.g., a change in the application secured by SMS). A history of these references may be maintained over time for historical, auditing and/or other purposes.

In some implementations, the SMS may support a process for taking a periodic, on-demand and/or triggered snapshot of a principal's state and/or level of access at a given point in time. This snapshot may include a record of the principal's membership in other groups/roles, states associated with the principal (e.g., including its privileges), as well as a record of references to the principal in external applications secured by the SMS (e.g. in a Cognos example, CAMID references to the principal in Cognos content, models and/or configuration). The SMS may support the ability to be able to view and/or edit these historical snapshots, and restore the principal to the state defined by an earlier snapshot. Restoring to an earlier snapshot of the principal's state may result in changes not only in the SMS, but also in applications secured by the SMS (e.g., in the Cognos implementation, CAMID references to the principal may be added or removed on Cognos content, models and and/or configuration in order to put them back into the state in which they were at the time of the snapshot). The user interface for this "restore to snapshot" feature may be versatile and gives administrators the ability to accept some of the pending changes while ignoring others.

In some implementations, the snapshot and/or restore capability for principals may be utilized in a feature in the SMS related to removing principals. When removing and/or disabling a principal, the SMS administrators may be given the option to snapshot the principal at the time of removal so that it can be later restored (e.g., in the implementation where it is later determined that the principal should not have been removed and/or disabled). If the SMS administrators decide to later restore the principal, they may do so within SMS, and may be given the option to restore the earlier snapshot (e.g., with the option to restore the principal's snapshot state in SMS and/or to restore selected and/or at least a portion of references to the principal in external systems secured by the SMS).

The SMS may enable access for users as other users. Allowing a first user to impersonate a second user may allow the first user to access the BI environment as the second user.

For example, if a help desk administrator is troubleshooting for a user, access to the BI environment as the user may help the help desk administrator troubleshoot (e.g., by having the capability to see what the user sees, access items as the user accesses items, and/or generate reports as the user). Access as a second user may facilitate identification of problems and/or issues since a more accurate view of the second user's specific BI environment may be obtained (e.g., in some implementations, the differences in privileges between a first user and a second user may cause the BI environment to display or behave differently to each user, which may make it more difficult for support personnel to diagnose end user problems).

In some implementations, a second user may be a manager that is experiencing problems with one or more functions of the BI environment. In some implementations, the first user, such as a help desk attendant, may be restricted from a portion of the second user's information for access, such as a password. For example, corporate policies may restrict sharing passwords, even with help desk attendants. Thus, the first user may request access to the BI environment as the second user to determine what problems the second user is experiencing in the BI environment.

In some implementations, impersonation may be utilized to delegate work. A first user may allow a second user to access the BI environment as the first user. For example, if the first user is going on vacation for a week, the first user may allow the second user access to the BI environment as the first user for the week. The SMS may receive a message (e.g., from the first user and/or an administrator) to modify an access listing such that the second user may obtain a predetermined access (e.g., predetermined user, predetermined time period, and/or predetermined subset of functions)

Figure 5:
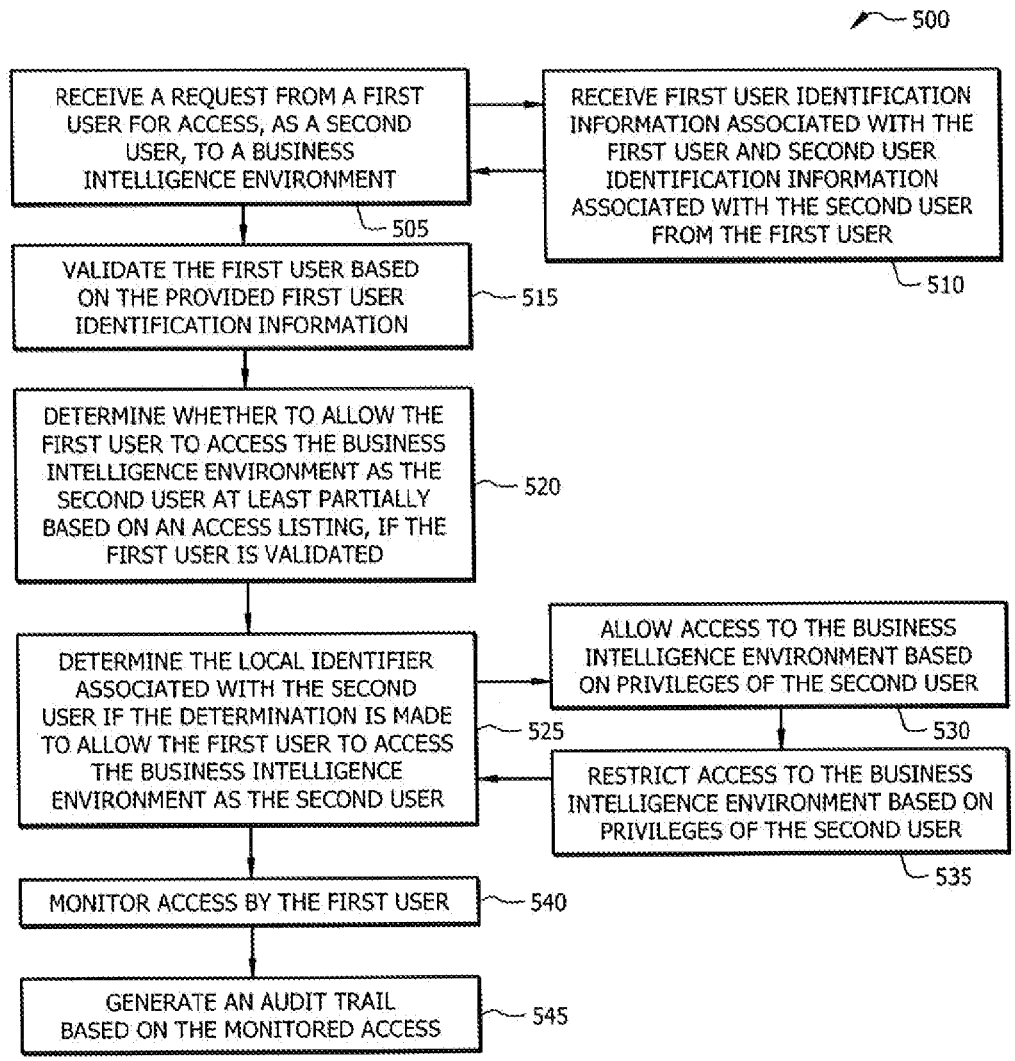
FIG. 5 illustrates an implementation of an example process for allowing a first user to access a BI environment as a second user.

FIG. 5 illustrates an implementation of an example process 500 for allowing a user access to the BI environment as another user. A request may be received from a first user for access, as a second user, to a BI environment (operation 505). For example, the BI environment may generate a "log in" user interface.

First user identification information associated with the first user and second identification information associated with the second user may be received from the first user (operation 510). The first user may be able to request access as the second user while providing limited user identification information. In some implementations, the first user may provide first user identification information that includes a set of two or more types of user identification information, and provide second user identification information that includes a subset of the types of user identification provided in the first user identification information. For example, the first user identification information may include a first number of types of user identification information and the second user identification information may include a second number of types user identification information, where the second number is less than the first number. For example, the first user may provide a first user name and first user password and a second user name. In some implementations, password sharing among security principals may be restricted (e.g., by corporate policy). The first user may provide other user identification information regarding the second user, such as a user name, when requesting access as the second user. Thus, a first user may be able to request access as a second user providing a different type of user identification information than the type of user identification provided for the first user.

The first user may be validated based on the provided first user identification information (operation 515). For example, the first user identification information (e.g. username and password) may be provided to the SMS namespace. The namespace may self-authenticate the first user or delegate authentication of the user to an external security source.

A determination may be made whether to allow the first user access to the BI environment as the second user at least partially based on an access listing, if the first user is validated (operation 520). For example, an access listing may be stored in a memory coupled to the SMS. The SMS may retrieve the access listing. The access listing may include associations between authorized users and users, roles, and/or groups, as which the authorized users may request access. The access listing may include time restrictions and/or other restrictions that at least partially govern access by users as other users. The SMS may determine whether the validated first user may be allowed access based on the associations in the access listing. The SMS may limit the users the first user may impersonate to members of the roles and/or groups within the association.

The local identifier associated with the second user may be determined if the determination is made to allow the first user access to the BI environment as the second user (operation 525). For example, the local identifier may be generated by a namespace and/or retrieved from a mapping of associated local identifiers and user identification information.

Access to the BI environment may be allowed based on the privileges of the second user (operation 530). For example, the SMS and/or the SMS Namespace may transmit the local identifier associated with the second user rather than the local identifier associated with the first user to the BI environment. The access allowed in the BI environment may be based on the local identifier, which is associated with privileges of the associated user in the BI environment.

Access to the BI environment may be restricted based on the privileges of the second user (operation 535). For example, access to the BI environment may be based on the local identifier of the second user, which is associated with privileges in the BI environment. The second user may have different privileges than the first user and access to privileges of the first user by the first user may be restricted when accessing the BI environment based on the local identifier of the second user.

Access by the first user may be monitored (operation 540). The SMS may monitor access in the BI environment by the first user, when accessing the BI environment as the second user. For example, operations performed, files opened, files retrieved, changes made, and other operations may be monitored. The data obtained from the monitoring may be saved in a memory coupled to the SMS.

An audit trail may be generated based on the monitored access (operation 545). For example, the audit trail may include access by the first user, times and dates of access, types of access, etc. In some implementations, alteration of at least a portion (e.g., monitored data) the audit trail may be restricted.

Process 500 may be implemented by various systems, such as system 100, 170, and/or 180. One or more operations of process 500 may be modified to include one or more operations of other described processes, such as those described in process 200, 300, and/or 400. In addition, various operations may be added, deleted, and/or modified. For example, the access listing may include user identification information for one or more authorized users authorized to access the business intelligence environment as another user, and at least one of user identities, user identification information, roles, or groups of users and user identification information associated with one or more of the authorized users.

In some implementations, when the first user provides first user identification information, the first user identification information may include a set of two or more types (e.g., user name, user identification code, password, and/or security image) of user identification. When the first user provides the second user identification information, the second user identification information may include a subset of the types of user identification provided in the first user identification information.

In some implementations, the first user may be restricted from one or more functions of the business intelligence environment allowed under privileges of the first user based on the privileges of the second user.

In some implementations, an audit trail of access by the first user as the second user is generated when the requested access is allowed. In some implementations, the audit trail may be retrieved and/or presented.

In some implementations, determining a local identifier of a second user may be at least partially based on a retrieved mapping. The retrieved mapping may include local identifiers generated by a different Security Namespace. For example, operations such as one or more of the operations described in processes 200, 300, and/or 400 may be utilized to determine a local identifier of a second user based on a retrieved mapping based on the second user identification information.

In some implementations, operations such as one or more of the operations described in processes 200, 300, and/or 400 may be utilized to validate the first user based on the first user identification information.

In some implementations, the first user identification information (e.g. user name and password) and the second user identification (e.g. user name) may be validated through a Security Migration System Namespace. The Security Migration System Namespace may authenticate based at least partially on the type of user.

In some implementations, the first user identification information may be authenticated based at least partially on the type of user. The type of user may be determined based at least partially on the provided first user identification information. The provided first user identification information may be authenticated independently of an External Security Source if the user type comprises a local user. The authentication of the first user identification information may be delegated to an external security source if the user type does not include a local user.

In some implementations, the second user identification information may be validated based at least partially on the type of user. The type of user may be determined based at least partially on the provided second user identification information. The provided second user identification information may be validated independently of an External Security Source if the user type comprises a local user. The validation of the second user identification information may be delegated to an external security source if the user type does not include a local user.

Example 1

Figure 6A:
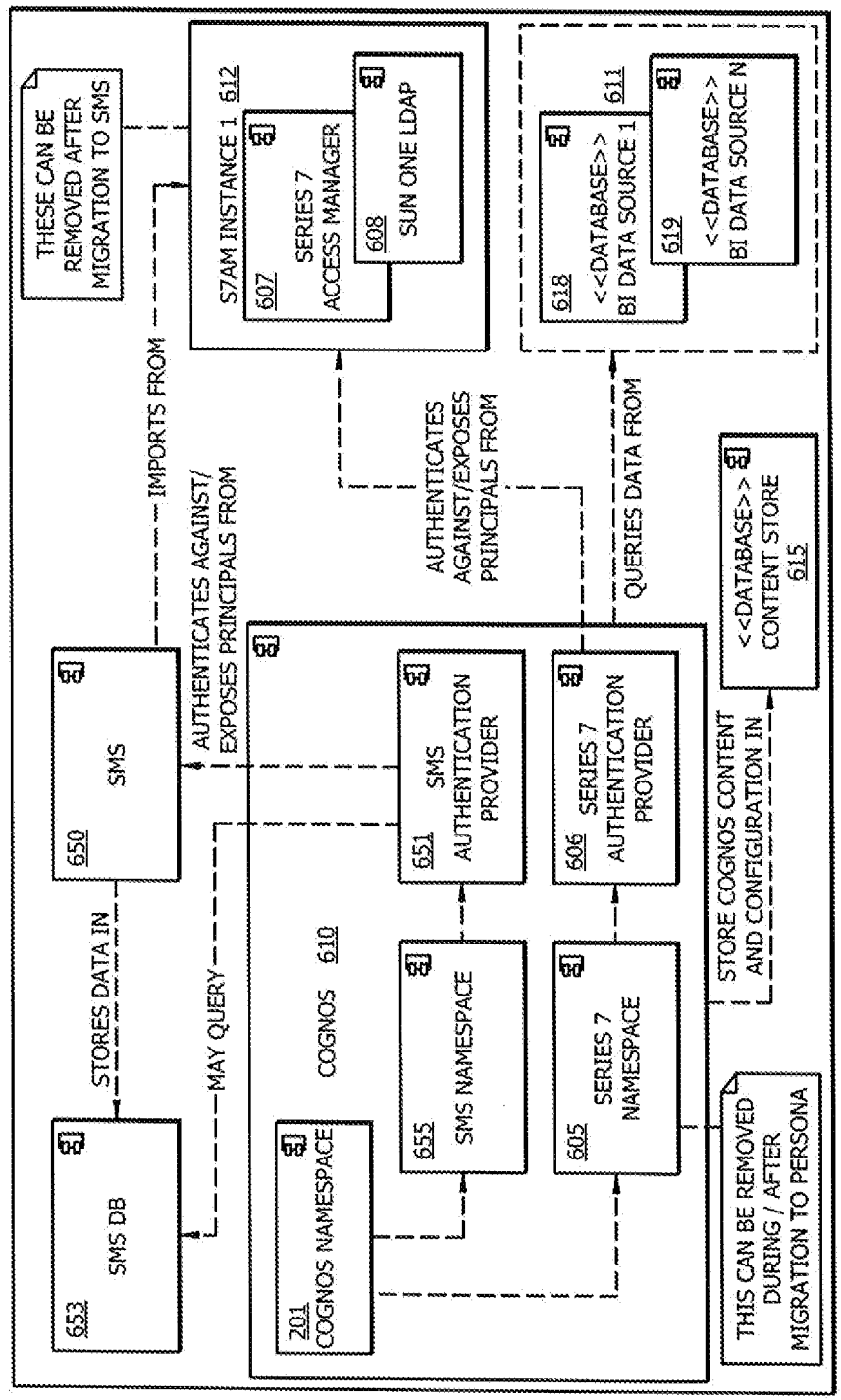
FIG. 6A illustrates an implementation of an example system.
Figure 6B:
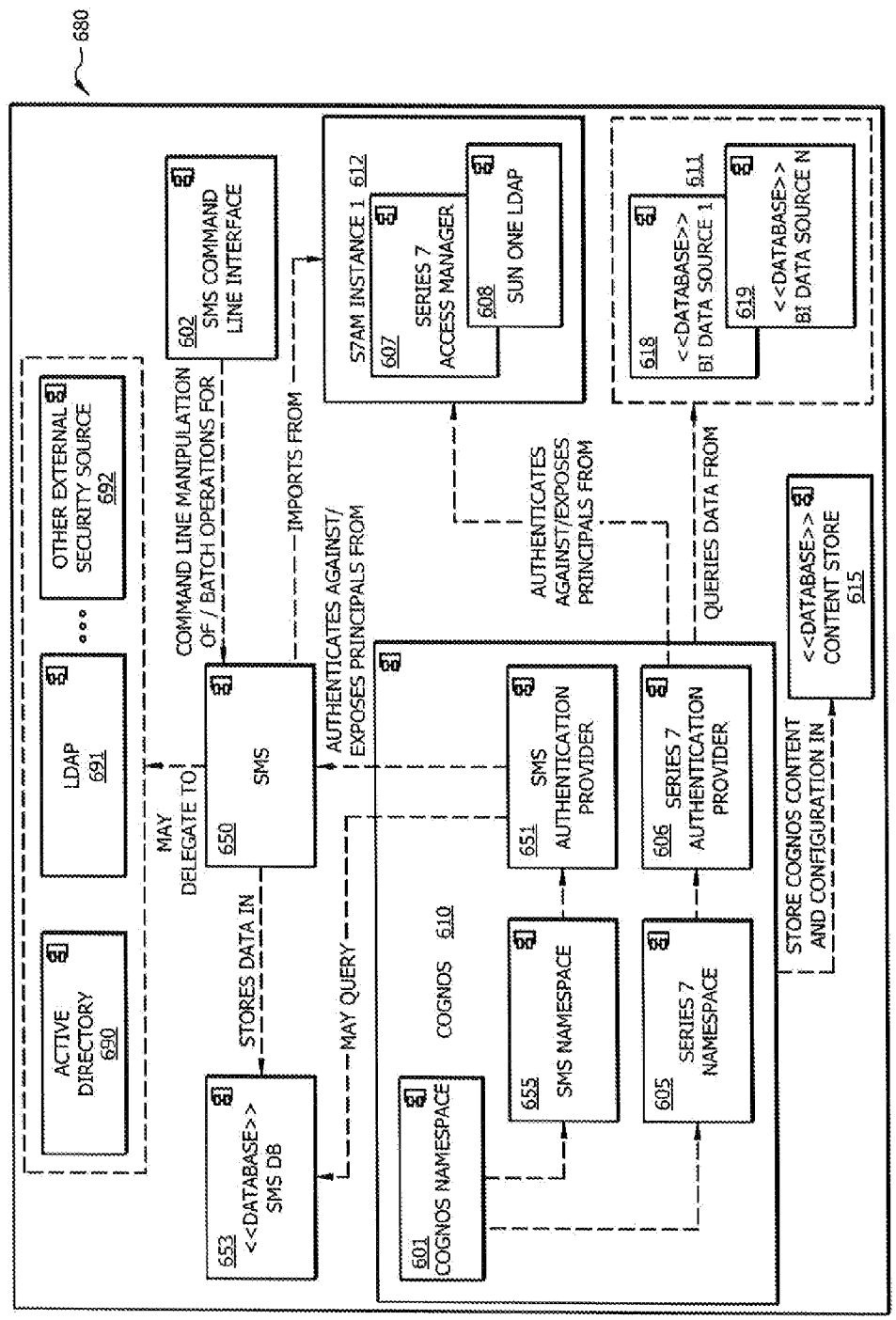
FIG. 6B illustrate an implementation of an example system.

FIGS. 6A and 6B illustrates an implementation of an example system that includes an SMS. As illustrated:

1. SMS Authentication Provider (651) is a Custom Authentication Provider that is designed to work with SMS (650). SMS Namespace (655) is an authentication namespace that utilizes SMS Authentication Provider (651) to support authentication and security administration against principals exposed via SMS (650).
2. SMS (650) is deployed in an application server (e.g. JBoss or Tomcat). It stores security related information (and other extensible properties which are defined on user, group or role basis) in its own database (653).
3. SMS Command Line Interface (602) can be utilized to perform batch manipulation of entities that live in SMS (650). For example, programmatic manipulation of users, groups, roles, properties, authentication policies, etc.

The SMS may be adapted to perform one of more of the following features, but not limited to:

1. The ability to mimic the CAMID's of other Cognos Authentication Namespaces (typically one which is being or has been replaced). This "mimic CAMID" ability is very important, as it allows Cognos Administrators to circumvent many of the typical namespace migration challenges (Cognos objects, models or configuration that refer to the CAMID's from the old security namespace no longer have to change).
2. The ability to delegate to zero or more other external security sources (e.g. Active Directory 690, or LDAP 691, etc.).
3. The ability to define local users/groups/roles (when desired)—e.g. create "test users" or "service account" users that are not backed by actual users in an external security source (they exist only in SMS). Sometimes it may be difficult to get certain types of accounts created in a tightly controlled corporate directory environment (e.g. a "test user" that doesn't correspond to a real human).
4. The ability to define additional properties on a per user, group or role basis (e.g. user Bob may be backed by an AD user, but additional properties for Bob can be defined in SMS 650). It may otherwise be cumbersome for the BI administrator to get corporate directory administrators to add/maintain these types of application specific properties.
5. The ability to import information from Series 7 Access Manager (607)/SunOne LDAP (608) (collectively shown as "S7AM Instance 1" 612). Series 7 Access Manager was a common authentication option in previous Cognos versions, but it is now viewed by many as a legacy tool (hence many customers who are using it have a desire to transition away from S7AM)
6. The ability to provide solutions to certain Cognos Custom Authentication Provider (CAP) requirements "one time" (e.g. building stored credentials, adding the ability of certain authorized accounts to "impersonate" other accounts, etc.).
7. Security information may be stored in (or replicated into) a de-normalized form in the SMS Database (653). This enables efficient and comprehensive reporting on principal related information. For example, a Cognos Package and a set of Reports that exposes security related information for BI purposes may be provided. A Cognos report against this Package could potentially answer questions such as: "show me all my users, their groups and roles, their properties," or "show me all users that have access to this Cognos package, along with information regarding how their access is achieved (through which group/role memberships)."

In some implementations, an existing external security source (e.g., an external security source) for a BI environment may be replaced with a new external security source (e.g., external security source). FIG. 6B illustrates an implementation of an example system 680 that may be utilized to assist in replacing external security sources.

An existing Cognos instance 610 may be updated to replace a Series 7 Access Manager Instance (612, 607 & 608) with SMS 650.

As part of the migration, administrators will install and configure SMS, the SMS database, and the SMS Authentication Provider, and will add the SMS Authentication Namespace.

There will also be additional steps (outlined below) that describe how SMS will import information from the existing Series 7 Access Manager and Cognos instances.

Once the migration has been completed, components 605, 607, 608 and 612 may be removed.

In this example, the goal of the administrator is to replace the following components:
Series 7 Namespace (605)
S7AM Instance 1 (612)
 Series 7 Access Manager (607)
 SunOne LDAP (608)
with the following components:
SMS Namespace (655)
SMS Authentication Provider (651)
SMS (650)
SMS DB (653)

In some implementations, one or more of the following operations may be performed:

1. An administrator installs and configures the SMS database (653) and SMS (650).
2. The administrator starts SMS (650).
3. Using the SMS user interface (a web based UI that is served up from SMS 650), the administrator initiates a workflow for replacing an existing Cognos authentication namespace. In this implementation, the administrator is replacing Series 7 Namespace (605), which may include:
    a. SMS prompts the administrator to specify the Cognos gateway and dispatcher endpoint(s) for the Cognos Instance (610). These endpoints are URLs.
        i. SMS validates the supplied information (e.g., testing the endpoints to make sure they are valid URL's that actually connect to Cognos Instance 610) and/or notifies the administrator if any of the information appears invalid.
    b. SMS prompts the administrator to provide details on the existing authentication namespace that will be replaced—in this implementation, the Series 7 Namespace (605). The administrator may supply this information by manually entering it or by uploading a cogstartup.xml file from Cognos Instance 610 (e.g., cogstartup.xml is the file which is created/modified by Cognos Configuration, and contains the information about existing namespaces). In the cogstartup.xml scenario, SMS will parse the file, and present the administrator a list of current namespaces (e.g., "which namespace would you like to replace?"). The administrator may select the Series 7 Namespace (605).
        i. SMS validates the supplied input.
    c. SMS prompts the administrator to provide a set of credentials from the namespace that is being replaced. This set of credentials will allow SMS to programmatically access the Cognos Instance 610 via the Cognos SDK. The Cognos "SDK" (short for "Software Development Kit") may be a set of libraries that allows clients to programmatically access and manipulate a remote (or local) Cognos instance through a set of exposed Cognos webservices. Invocations through the SDK typically result in SOAP messages targeted at a Cognos webservice. In some implementations cases, the supplied credentials identify an account that is a member of the System Administrators role in the Cognos Namespace. These credentials may include Namespace ID, Username, and/or Password.

i. SMS validates the supplied information by authenticating to Cognos using the previously supplied dispatcher URL and the currently supplied credentials. This is done via the Cognos SDK. In some implementations, raw SOAP requests may be generated and issued directly against exposed Cognos webservices. Going through the SDK effectively does this for the client (but at times, it may be useful to generate SOAP requests directly). SMS stores portions of this information in the SMS Database (650), correlated with information obtained in the previous step. SMS warns the administrator if the input information does not work.
  i. SMS validates that the identity of the supplied credentials possesses the appropriate Cognos roles to complete the workflow (e.g. the supplied account is a member of System Administrators role in Cognos Namespace (601)).
d. SMS prompts the administrator for information on the external security source (in this implementation, Series 7 Access Manager (607) and SunOne LDAP (608)). For example:
  i. the type of external security source (in this implementation Series 7 Access Manager).
  ii. additional information on the security source such as: host, port, and/or version.
  iii. credentials capable of directly accessing the security source (if different from earlier supplied Cognos credentials).
e. SMS presents the information accumulated thus far (for review), and asks if the administrator wishes to proceed with the "import phase" [the administrator clicks yes].
  i. SMS extracts information from Cognos (610). In particular, it pulls information for all users, groups and roles from the namespace being replaced (including the existing CAMID for each of these principals). SMS stores this information in the SMS Database (650).
  ii. SMS extracts information from Series 7 Access Manager (607)/SunOne LDAP (608). This may be done programmatically, or prompting the administrator to generate one or more export files and then directing the administrator to supply these to SMS may do it.
  iii. SMS may gather certain statistics on Cognos Instance 610 and configuration with respect to the users, groups and roles in namespace being replaced. In particular, SMS may record details on various Cognos objects, configuration and models that reference the users, groups and roles from the namespace being replaced. This recorded information may be used after the migration is complete to verify that each security principal exposed through Series 7 Namespace (605) has been migrated properly and that the CAMID references still resolve to the same security principal (now exposed through SMS Namespace (655)).
f. After the import phase is complete, SMS provides a set of instructions to the administrator. These instructions provide detailed steps on how to install and configure the SMS Authentication Provider (651) and the SMS Namespace (655) in Cognos (610). For example:
  iii. Shutdown the Cognos Instance 610.
  iv. Run an installation script that is supplied by the SMS server (650). This script is pre-configured based on the information SMS has accumulated thus far. The script will deploy the SMS Namespace (655), the SMS Authentication Provider (651) and configure the required assets to the Cognos Instance 610. Some of the steps this script applies are:
    a. copies the jar files required for SMS Authentication Provider (651) to the Cognos installation's webapps/p2pd/WEF-INF/lib directory
    b. copies the SMS.properties file to the Cognos installation's conf directory
    c. massages (or replaces) the Cognos instance's cogstartup.xml file to:
      i. disable the namespace being replaced—in this implementation Series 7 Namespace (605)
      ii. add the SMS Authentication Namespace (655)—reusing the same Namespace ID that was specified by Series 7 Namespace (605)
  v. Restart the Cognos Instance 610
g. SMS provides a link for the administrator to signify that they've completed installation of the SMS Namespace (655) and SMS Authentication Provider (651) into the Cognos Instance 610. At this point, the SMS server gives the administrator the option of running a diagnostics test. This diagnostics test will validate that the Cognos Instance 610 is properly configured to talk to the SMS Server (650). It will also run various tests that ensure that information imported in previous steps is all valid and available in the new configuration. If errors are detected, SMS provides the administrator with hints on how to correct the configuration.

Example 2

In some implementations, SMS may be used as a Bridge to a New (Non-SMS) External security source. SMS's ability to mimic legacy local identifiers, such as CAMIDs in Cognos, can also be utilized as a "bridge" from an existing legacy external security source to a new (non-SMS) external security source. The SMS may be utilized to avoid invalid CAMID problems.

In some implementations, an IT Staff from Company B may successfully migrate security related information from Active Directory Instance A into Active Directory Instance B, but Cognos Administrators may still face significant challenges related to the CAMID references in their Cognos Instance.

Cognos Administrators were left with two choices for switching the Cognos Instance to point at Active Directory Instance B (both of which will likely result in invalid CAMID references in the Cognos content, configuration and models).
  1. They could re-configure the existing Authentication Namespace A to point at Active Directory Instance B.
  2. They could add a second authentication namespace ("Authentication Namespace B") to their Cognos Instance that points at Company B's Active Directory instance.

Figure 7:
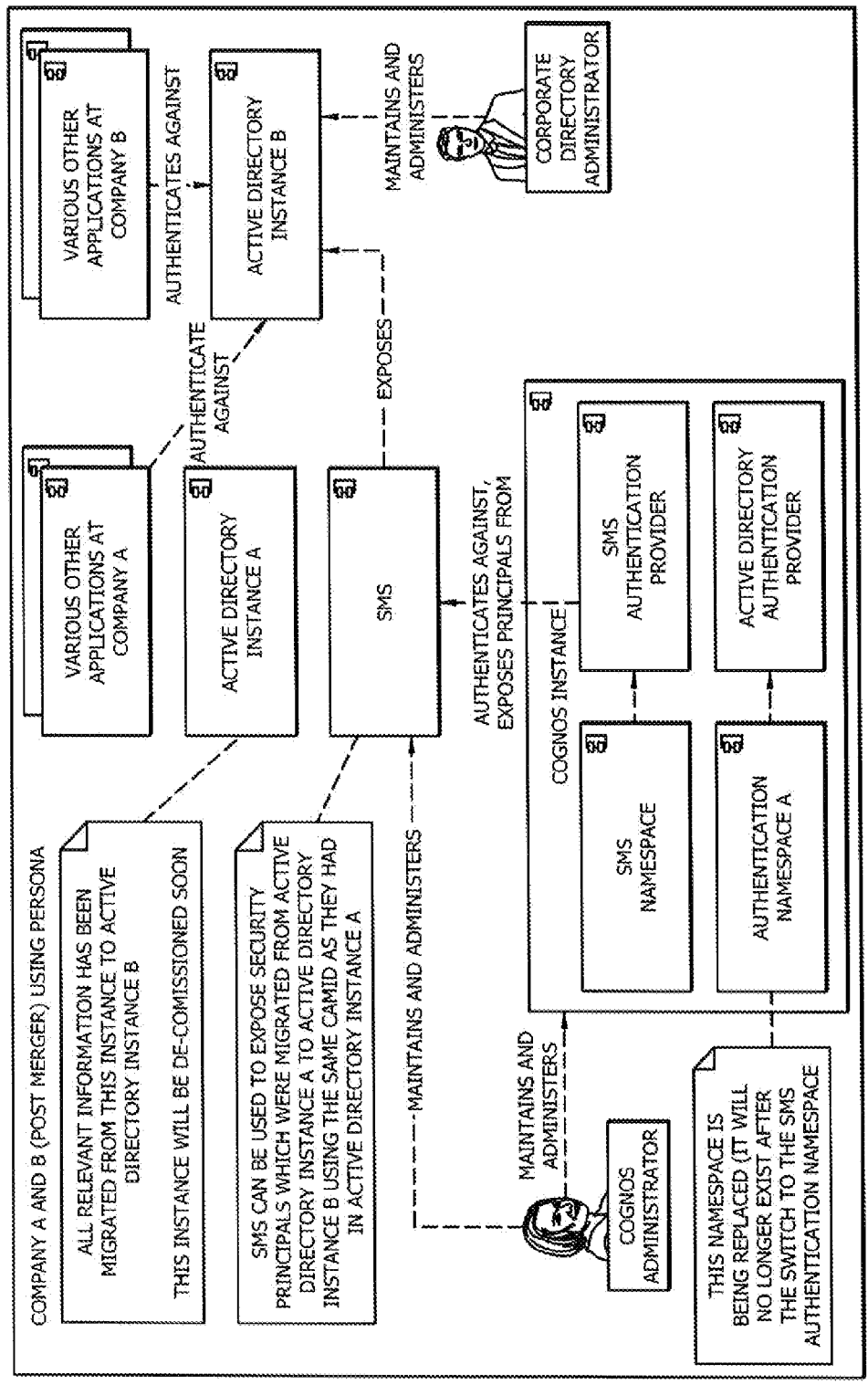
FIG. 7 illustrates an implementation of an example system.

The SMS may be utilized to switch the Cognos instance. FIG. 7 illustrates an illustration of an example system 700. In this scenario, SMS may be used to expose those principals that originally resided in Active Directory Instance A, but were migrated into Active Directory Instance B. SMS will expose these principals to Cognos using the exact same CAMID they possessed in the earlier configuration (effectively bypassing the invalid CAMID problem which typically affects this sort of migration). In various implementations, as illustrated in FIG. 7:

1. An administrator installs and configures SMS and the SMS database (not shown on this diagram). This may be the Cognos Administrator shown on the diagram, or other administrator who works for Company B.
2. The administrator starts SMS.
3. Using the SMS user interface (a web based UI that is served up from SMS), the administrator initiates a workflow for replacing an existing Cognos authentication namespace. In this implementation, the administrator is replacing Authentication Namespace A. In various implementations, this may include:
   a. SMS prompts the administrator to specify the gateway and dispatcher endpoint(s) for the Cognos Instance.
      vi. SMS validates the supplied information (testing the endpoints to make sure they are valid URL's that actually hit the Cognos Instance) and warns the administrator if any of it seems invalid.
   f. SMS prompts the administrator to provide details on the existing authentication namespace that will be replaced—in this implementation, Authentication Namespace A is selected. The administrator may supply this information by manually entering it or by uploading a cogstartup.xml file from the Cognos Instance (cogstartup.xml is the file that is created/modified by Cognos Configuration, and contains the information about existing namespaces). In the cogstartup.xml scenario, SMS will parse the file, and present the administrator a list of current namespaces ("which namespace would you like to replace?"). [the administrator selects Authentication Namespace A]
      i. SMS validates the supplied input.
   g. SMS prompts the administrator to provide a set of credentials from the namespace that is being replaced. This set of credentials will allow SMS to programmatically access the Cognos Instance via the Cognos SDK. These credentials are generally comprised of Namespace ID, Username and/or Password.
      i. SMS validates the supplied information by authenticating to the Cognos Instance using the previously supplied dispatcher URL and the currently supplied credentials. This is done via the Cognos SDK. SMS warns the administrator if the input information does not work.
      ii. SMS validates that the identity of the supplied credentials possesses the appropriate Cognos roles to complete the workflow (e.g. the supplied account is a member of System Administrators role in the Cognos namespace).
   h. In some implementations, the SMS may prompt the administrator for information on the original external security source (in this implementation, Active Directory Instance A). For example,
      i. the type of external security source (in this implementation Active Directory).
      ii. any additionally required information such as host, port, and/or version.
      iii. credentials capable of directly accessing the security source (if different from earlier supplied Cognos credentials).
   i. In some implementations, the SMS may prompt the administrator for information on the new external security source (in this implementation, Active Directory Instance B). For example,
      i. the type of external security source (in this implementation Active Directory).
      ii. any additionally required information such as host, port, and/or version.
      iii. credentials capable of directly accessing the security source (if different from earlier supplied Cognos credentials).
      iv. SMS prompts the administrator for "mapping" rules related to different types of principals. In some cases, a principal may be named differently in the original security source than in the destination security source (e.g. the same person may be identified by the logon "lhankins" in the original Active Directory instance, but as "lance.hankins" in the destination Active Directory instance). SMS allows the administrator to select from a configurable set of rules that defines how to map principals from the original security source to corresponding principals in the destination security source.

In some implementations, the supplied credentials identify an account that is a member of the System Administrator's role in the Cognos namespace.
   f. SMS presents the information accumulated thus far (for review), and asks if the administrator wishes to begin the "import phase" (administrator clicks yes).
      v. SMS extracts information from the Cognos Instance. In particular, it pulls information for all users, groups and roles from Authentication Namespace A (including the existing CAMID for each of these principals). SMS stores this information in the SMS Database (not shown on the diagram).
      vi. In some implementations, SMS extracts additional information from the Active Directory Instance A. SMS stores portions of this information in the SMS Database, correlated with information obtained in the previous step.
      vii. In some implementations, SMS extracts additional information from the Active Directory Instance B. SMS stores portions of this information in the SMS Database, correlated with information obtained in the previous two steps.
      viii. SMS may gather certain statistics on the Cognos Instance and configuration with respect to the users, groups and roles in namespace being replaced. In particular, SMS may record details on various Cognos objects, configuration and models that reference the security principals from the namespace being replaced. This recorded information may be used after the migration is complete to verify that each security principal has been migrated properly and that the CAMID references still resolve to the same principal (now exposed through SMS).
      ix. Using the information collected in previous steps and selections regarding the configurable set of rules for mapping of principals, SMS will attempt to "map" all principals exposed from Authentication Namespace A to their corresponding principals in Active Directory Instance B.
   j. After the initial import phase is complete, SMS may present a list of unmapped principals to the administrator (these are principals from Authentication Namespace A for which the mapping rules were not able to find a corresponding principal in Active Directory Instance B).
      i. The administrator may refine the mapping rules for each of the unmapped principals, or manually map them to their corresponding principal in the destination security source (Active Directory Instance B), or choose to ignore certain unmapped principals.
      ii. SMS repeats the matching process until all principals of interest have been properly mapped (or specified as ignored by the administrator).

k. SMS provides a set of instructions for the installation of the SMS Namespace and SMS Authentication Provider to the administrator. Instructions on how to install and configure the SMS Authentication Provider and the SMS Namespace in the Cognos Instance may include:
  i. shutdown the Cognos Instance.
  ii. run an installation script that is supplied by the SMS server. This script will deploy the SMS Authentication Provider and configure the required assets to the Cognos Instance. The steps of this script may include:
    a. copies the jar files required for SMS Authentication Provider to the Cognos Instance's installation's webapps/p2pd/WEF-INF/lib directory
    b. copies the SMS.properties file to the Cognos Instance's conf directory
    c. massages (or replaces) the Cognos Instance's cogstartup.xml file to:
      i. disable the namespace being replaced (Authentication Namespace A)
      ii. add the SMS Authentication Namespace (uses the same namespace ID as the namespace being replaced).
      iii. Restart the Cognos Instance
l. SMS provides a link for the administrator to signify that they've completed installation of the SMS Authentication Provider into the Cognos Instance. At this point, the SMS server gives the administrator the option of running a diagnostics test. This diagnostics test will validate that the Cognos Instance is properly configured to talk to SMS. It will also run various tests that ensure that information imported in previous steps is all valid and available in the new configuration. If errors are detected, SMS provides the administrator with hints on how to correct the configuration.

Example 3

In some migration implementations, political and technical challenges are present. For example, IT Staff from Company C were trying to determine how they could resolve both the political and technical challenges associated with migrating their Cognos instance's authentication away from the departmentally controlled Series 7 Access Manager instance and into the corporate controlled Active Directory Instance.
  Some of the challenges were:
  1. Mapping accounts for physical employees in Series 7 Access Manager to their corresponding accounts in Active Directory. This is not an overly difficult task, but for a large number of accounts, it does involve a lot of manual work (especially if the logons don't match between the two systems)
  2. The "sample users" or local users (e.g. "Corporate Auditor", "HR Specialist") posed a political challenge. These aren't real employees, so the corporate directory administrators don't want them defined in Active Directory. The QA team needs them in order to properly QA new versions of BI content.
  3. The 25,000 user classes defined in Series 7 Access Manager posed a bit of a problem (the AD team was not particularly fond of creating these very fine grained and application specific user classes as groups/roles in the corporate AD instance).
  4. Once principals are moved from Series 7 Access Manager into Active Directory, there will be significant challenges regarding invalid CAMID references in the Cognos Instance's content, configuration and models (these CAMID references would still reference principals from the old Series 7 namespace).

Figure 8:
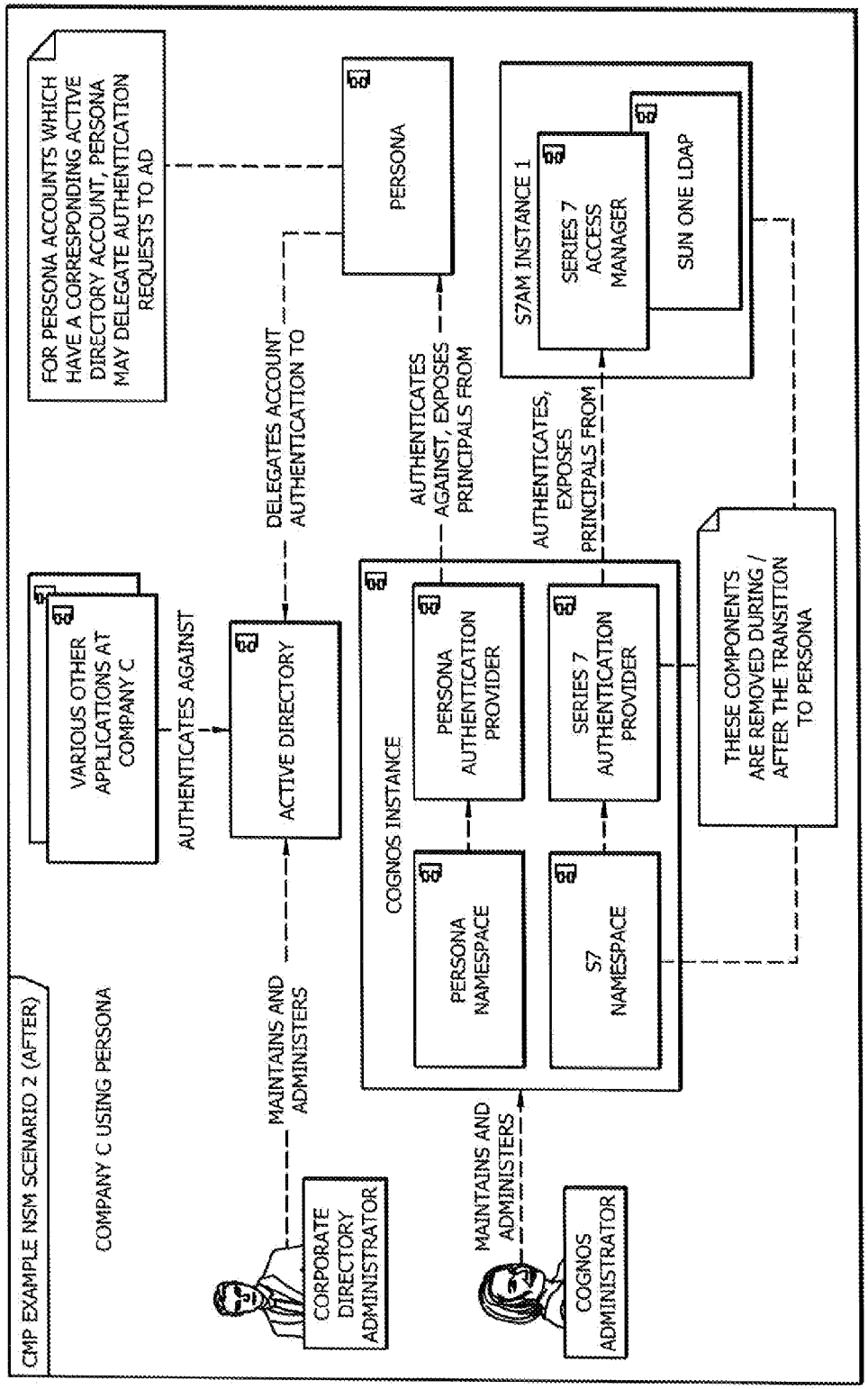
FIG. 8 illustrates an implementation of an example system.

The SMS may be utilized to facilitate the migration. FIG. 8 illustrates an implementation of a system 800 utilized to facilitate the migration. The SMS may mitigate one or more of the challenges in some implementations.
  The steps in using SMS to solve the issues in this scenario may include the following:
  1. SMS and the SMS Database (not shown) are installed and configured by administrators
  2. At the direction of administrators, SMS imports and records information on the security principals defined in S7 namespace. This information is imported from the Cognos Instance (via the SDK) and from the Series 7 Access Manager/SunOne LDAP instance. This information is stored in the SMS Database.
    a. SMS may gather certain statistics on the Cognos Instance and configuration with respect to the principals in the namespace being replaced. In particular, SMS may record details on various Cognos objects, configuration and models that reference the principals from the namespace being replaced. This recorded information may be used after the migration is complete to verify that each principal has been migrated properly and that the CAMID references in the new configuration still resolve to the same principal (now exposed from SMS through the SMS Namespace and SMS Authentication Provider).
  3. The SMS Namespace and SMS Security Provider are installed and configured in the Cognos Instance.
    a. The S7 Namespace is disabled/removed.
    b. The SMS Namespace is configured to use the same Namespace ID as the S7 Namespace. The Namespace ID is typically embedded as part of the CAMID; in order to preserve the CAMID's in the new configuration, we reuse the same Namespace ID.
  4. SMS is configured in the following way:
    a. The Active Directory instance is configured as an external security source.
    b. SMS accounts for physical employees are associated with their corresponding accounts in Active Directory. This is handled through a mapping workflow in SMS that will automatically correlate accounts in SMS to accounts in Active Directory, matching on a configurable set of rules that are generally authored in terms of account attributes (first name, last name, logon, etc.).
    c. SMS is configured such that authentication requests targeted at SMS for physical employee accounts are delegated to the Active Directory instance.
    d. SMS is configured such that authentication requests targeted at SMS at accounts that are not correlated with an associated Active Directory account are treated differently (e.g. the "sample users"). These accounts are treated as local SMS accounts. Credentials for these local SMS accounts are maintained in SMS, and authentication requests to SMS directed at these accounts are verified against these local credentials (these authentication requests are NOT delegated to Active Directory).
    e. The 25,000 user classes from the Series 7 Access Manager/SunOne LDAP instance are imported into SMS. These now exist as Groups or Roles in SMS (and do not have to be imported into the Active Directory Instance).

Example 4

In some implementations, SMS may be used as a Bridge when upgrading from Cognos Express to the full version of Cognos. In Cognos Express, security principals are stored in a small relational database. An authentication provider exposes these principals to Cognos Express through a configured authentication namespace. Content, models and configuration in Cognos Express utilize CAMID's to reference security principals in much the same way as they do in the full version of Cognos.

When upgrading from Cognos Express to the full version of Cognos, customers are faced with one or more of the same migration challenges that have been previously outlined described. In the full version of Cognos, they must define an authentication provider that supports one of the standard external security sources supported by the full version of Cognos (this list does not currently include the small relational database that is used by Cognos Express).

SMS may be utilized to as a bridge by, for example:
1. An administrator installs and configures SMS.
2. An administrator directs SMS to import security information from Cognos Express's relational database.
3. An administrator directs SMS to import information from the Cognos Express instance related to all security principals exposed from the original authentication namespace (via the SDK).
4. The BI Team installs the full version of Cognos, and imports the Cognos Express content into it.
5. The BI Team deploys and configures a SMS Authentication Namespace and SMS Authentication Provider into the full Version of Cognos. SMS and the SMS Authentication Namespace are configured in such a way that the security principals imported from Cognos Express are exposed via SMS with the exact same CAMID's they had in Cognos Express.

Now the content defined in Cognos Express has been imported into the full version of Cognos. The CAMID's for a set of security principals that were originally defined in Cognos Express (in the aforementioned relational database) are kept the same in the full version of Cognos. In the full version of Cognos, these principals are now exposed through the SMS Authentication Namespace, the SMS Authentication Provider and the SMS application server/database.

End of Examples

Although specific implementations have been described in Examples 1-4 various operations may be added, deleted, and/or modified. In some implementations, operation(s) of the described processes may be performed in combination with other processes.

The processes described in FIGS. 2-5, Examples 1-4, and/or operations thereof may be implemented by various systems, such as the system described in FIG. 1 and/or the various examples. In addition, various operations may be added, deleted, and/or modified. In some implementations, operation(s) of the described processes may be performed in combination with other processes.

Although specific implementations of features, components, and/or operations have been described herein, other implementations of these features, components, and/or operations may be included in the described systems and/or processes. For example, although an implementation of the SMS may include and/or be described as Persona, other implementations of SMS may be utilized with the described systems and/or processes. Although an implementation of the BI environment may include and/or be described as IBM Cognos or Cognos, other implementations of BI environment may be utilized with the described systems and/or processes. Although an implementation of the Security Namespace may include and/or may be described as a namespace and/or authentication namespace, other implementations of Security Namespace may be utilized with the described systems and/or processes. In some implementations, the security namespace may include an authentication provider and/or an authentication namespace. Although an implementation of user identification information may include and/or be described as user identifier, username, user name, user identifier, and/or credentials, other implementations of user identification information may be utilized with the described systems and/or processes. Although an implementation of the External Security Source may include and/or may be described as an authentication source and/or authentication source provider and/or an authentication service provider, other implementations of external security source may be utilized with the described systems and/or processes. In some implementations, although an implementation of a local identifier may be described as CAMID (e.g., in IBM Cognos), other implementations of local identifiers may be utilized with the described systems and/or processes.

Although in various implementations, users are described (e.g., as providing user identification information, validating, etc.), any security principal may be utilized. For example, to allow access as a role, a user may provide role identification information, a local identifier may be determined, and access may be provided for the role based on the determined local identifier.

In various implementations, specific BI ecosystem(s), BI environment(s), BI artifact(s), BI artifact aspect(s), BI outputs, etc. have been described. However, the described system(s) and process(es) may be utilized with a variety of BI ecosystem(s), BI environment(s), BI artifact(s), BI artifact aspect(s), and/or BI outputs. For example, an IBM Cognos BI environment and/or various components of the IBM Cognos BI have been described in various implementations as examples; however, other types of BI environments and/or components of other types of BI environments may be utilized in the described systems and processes.

Although Users have been described as a human, a User may be a person, a group of people, a person or persons interacting with one or more computers, and/or a computer system.

Systems that include computers, such as the BI environment, user devices, SMS, and/or external security sources, have been described in various implementations. The computer may include a processor that executes instructions and manipulates data to perform operations of the computer. The processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as lists of components of a BI ecosystem, communication protocols, sets of security principals, user identification information, format information, access lists, audit trails, historical data, and/or any other appropriate information. In addition, various software may be stored on the memory. For example, instructions, such as operating systems and/or other types of software (e.g., module(s), such as system agent(s)) may be stored on the memory. The modules (e.g., SMS and/or SMS namespace) may perform various operations, such as the operations in the described systems and processes (e.g., operations described in FIGS. 2-5). For example, the module (e.g., system agents) may generate mappings, retrieve information from external security sources, retrieve information from namespaces, associate information, enable access based on local identifiers, determine local identifiers, generate local identifiers, self-authenticate, delegate authentication, provide namespaces, allow impersonation of users, determine and/or modify access listings, determine if a user can access a BI environment as a different user, determine candidate improvements, save data, monitor data and/or functions of the described systems and/or processes, and/or other appropriate operations.

In some implementations, system agent(s) and/or other modules may be combined as a single module or may be distinct modules. Modules may include various modules and/or sub-modules.

A communication interface may allow the computer to communicate with other components of the BI ecosystem, other repositories, and/or other computer systems. The communication interface may transmit data from the computer and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the described system stored in the memory may be updated and/or altered through the communication via network protocols (e.g., remotely through a firmware update and/or by a device directly coupled to the computer).

The computer may include a presentation interface to present data to a User, such as though a monitor and speakers. The presentation interface may facilitate receipt of selections from Users.

Although example computers that may be used with the disclosure have been described, the described systems and processes may be implemented through various computers such as servers, as well as a server pool. For example, the BI environment may include a general-purpose SMS1 computer (PC) a Macintosh, a workstation, a UNIX-based computer, a server computer, or any other suitable device. The computer may be adapted to execute any operating system including UNIX, Linux, Windows, or any other suitable operating system. The computer may include software and/or hardware in any combination suitable to provide access to data and/or translate data to an appropriate compatible format.

Although a single processor has been described, multiple processors may be used according to particular needs, and reference to processor is meant to include multiple processors where appropriate.

A memory of the computer may include any appropriate memory including a variety of repositories, such as, SQL databases, relational databases, object oriented databases, distributed databases, XML databases, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvS-RAM), and/or phase-change memory (PRAM).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a User, the systems and techniques described here can be implemented on a computer having a display device (e.g., a CRT (cathode ray tube) or LCD (liquid crystal display) monitor) for displaying information to the User and a keyboard and a pointing device (e.g., a mouse or a trackpad) by which the User can provide input to the computer. Other kinds of devices can be used to provide for interaction with a User as well; for example, feedback provided to the User by an output device can be any form of sensory feedback (e.g., visual feedback, auditory feedback, or tactile feedback); and input from the User can be received in any form, including acoustic, speech, or tactile input.

A graphical User interface (GUI) of the interface(s) generated by the system may be displayed on a presentation interface of the User device, such as a monitor or screen. GUI may be operable to allow the User of a User device to interact with repositories and/or various interface(s). Generally, GUI provides a User with an efficient and User-friendly presentation of data provided by the system. GUI includes a plurality of displays having interactive fields, such as image icons, pull-down lists, fillable fields, and editable text operated by the User. And in one example, GUI presents an explore-type interface and receives commands from the User. It should be understood that the term graphical User interface may be used in the singular or in the plural to describe one or more graphical User interfaces in each of the displays of a particular graphical User interface. Further, GUI contemplates any graphical User interface, such as a generic web browser, that processes information in the system and/or User device and efficiently presents the information to the User. In some implementations, GUI may present a web page embedding content. The server can accept data from a User device(s) via the web browser (e.g., Microsoft Internet Explorer, Firefox, Safari, or Chrome) and return the appropriate Hyper Text Markup Language (HTML) or eXtensible Markup Language (XML) responses.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a user identification" includes a combination of two or more user identifications and reference to "a user" includes different types and/or combinations of users. As another example, "coupling" includes direct and/or indirect coupling of members (e.g., of the BI environment, SMS, and/or external security systems).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and operations described in the specification. As one of ordinary skill in the art will readily appreciate from the disclosure, processes, machines, manufacture, compositions of matter, means, methods, or operations, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or operations.

Glossary of Selected Terms

While dictionary meanings are also implied by certain terms used herein, the following exemplary utilizations of certain terms may be useful.

"Business Intelligence", which is also known by the acronym "BI", generally refers to computer-based techniques used in identifying, extracting, and/or analyzing business data. BI is a set of methodologies, processes, architectures, and/or technologies that transform raw data into meaningful and useful information used to enable more effective strategic, tactical, and operational insights and decision-making. BI technologies may provide historical, current, and/or predictive views of business operations. Common functions of BI technologies include online analytical processing, analytics, data mining, process mining, complex event processing, business performance management, benchmarking, text mining, predictive analytics, and reporting. While BI and competitive intelligence both support decision making, BI may use technologies, processes, and applications to analyze mostly internal, structured data and business processes while competitive intelligence gathers, analyzes and disseminates information with a topical focus on company competitors. Accordingly, BI can be broadly understood to include competitive intelligence as a subset thereof.

"Business Intelligence software" means software that provides BI functionality. Commercially available BI software includes: IBM Cognos® available from IBM Corporation Armonk, N.Y.); SAP Business Objects® available form SAP AG (Walldorf, Germany); MicroStrategy® available from MicroStrategy (Tysons Corner, Va.); QlikView® available from QlikTech (Radnor, Pa.), and others.

"Business Intelligence environment" means a single instance of the BI software, installed on one or more computers. The instance may include process(es) that may coordinate together in some fashion to provide BI functionality to User(s). The instance may host content such as BI artifacts, and may provide insight into one or more data sources (generally abstracted by one or more BI metadata layers). An organization may include multiple BI environments that are targeted toward different purposes. In some implementations, for example, an organization may have the following BI environments:

Development—A BI environment where BI developers create or update BI content (e.g. BI artifacts) which is meant to eventually be consumed by end Users. The BI content in this type of environment is often not yet published to end Users.

QA—A BI environment where quality assurance ("QA") professionals (also known as testers) verify the proper functioning of BI artifacts. Developers usually build out new versions of BI content in the development environment and then, at periodic checkpoints, promote that BI content from the development BI environment into the QA BI environment so that it can be tested.

Production—A "live" BI environment where end Users are reviewing, analyzing, and using the BI content. Tested BI content may be promoted from the QA BI environment into the production environment once it has passed through the organization's quality assurance processes. While many end Users may simply consume BI content which was promoted from the Development environment through the QA environment into the Production environment, other end Users may create their own BI content in the live Production BI environment (this is often termed "self-service" BI).

Organizations may configure various other types of BI Environments directed towards different goals. For example, a performance testing BI environment may be a separate environment configured for the purpose of performance testing, load testing or stress testing. A sandbox BI environment may be used to evaluate the impact of a new version of the BI software or a new version of the database software. BI environments may be virtual, in which case multiple copies of the same virtual environment might be instantiated. "Business Intelligence ecosystem" means the entirety of the BI system, including the BI environment, the BI artifacts, metadata models, and configuration details contained within the BI environment or authored for the purpose of being deployed in the BI environment, the BI-accessible data sources utilized by the BI environment, the ETL (extract, transform, load) processes that push data into BI-accessible data sources, the upstream data sources from which the ETL processes pull data, and/or the computer(s) that host all of these components.

"Business Intelligence artifact" is a generic categorization for an authored BI object that resides in a BI environment and may be accessed by Users either directly or indirectly (e.g., by utilizing the BI artifact to expose BI data from one or more BI data sources). Examples of BI artifacts in the context of IBM Cognos® include reports, metadata models (framework models and packages), transformer models, metrics models, query objects, active reports, events, analysis objects, dashboards, and/or business insight advanced objects, among others. Certain properties may be common to many types of BI artifacts, including, but not limited to: name; description; policy set (security policies); specification and/or screentip, in some implementations.

"BI Artifact Specification" is one property of a BI Artifact. A BI Artifact Specification may have a variety of purposes depending on the type of BI Artifact. As an example, the BI Artifact specification may describe to the BI software how one or more data sources should be queried; how intermediate data (e.g., such as intermediate reports) should be summarized, post-processed, and potentially merged with other datasets; and/or how the resultant datasets should be rendered visually. BI Artifact specifications may be authored within an editing tool provided by the vendor of the BI software (or by some other means such as a text editor). A BI Artifact specification may encode most, if not all, of the information necessary for a BI system to service a BI artifact execution request. In some implementations, other properties, such as the associated metadata model or security policies, may be recorded as other properties on the BI Artifact itself. Concrete examples of BI artifact specifications include report specifications, analysis object specifications, query object specifications, interactive report specifications, etc.

"BI Output" means output produced by the successful execution of BI artifact(s) in the BI environment. End Users may execute a BI Artifact in the BI Environment to produce one or more BI outputs. In some implementations, an output may include, but is not limited to, a variety of information presented (e.g., on a presentation device, on paper, etc.) in a variety of forms, such as electronic file(s) and/or streams of data. The BI Output may be generated in a format (e.g., PDF, HTML, MHTML, CSV, Excel, Flash, Javascript, XML and/or other suitable formats) designated by the User and/or the system (e.g., the system may retrieve the format). In the case of web oriented BI Outputs (e.g. HTML, XHTML, MHTML and/or other suitable formats), the BI output file may contain references to other external resources (e.g. css files, javascript files, static images, dynamic images for charts and/or other visualizations, and/or vector graphics). Examples of BI Outputs may include a report output, metrics output, query object output, active report output, event output, analysis object output, dashboard output, and/or business insight advanced object output. Certain properties may be common to many types of BI artifacts, including, but not limited to: name; description; policy set (security policies); specification and/or screentip, in some implementations. As a non-limiting example, in IBM Cognos®, an analysis object is a type of BI artifact. Analysis objects may be authored in Analysis Studio by a User of the BI Environment (an Analysis object's specification is created/edited in Analysis Studio). A User may then execute the analysis object in the BI Environment (an example of an artifact execution request) with a given set of inputs (the artifact execution inputs) to produce a BI output (e.g. a PDF or HTML file which provides a rendering of data from one or more BI data sources which are exposed by the analysis object, often times through a metadata model).

"Metadata model" means a BI abstraction layer that sits on top of one or more physical or virtualized data sources (a virtualized data source is achieved using software that makes multiple physical data sources appear as a single data source). The metadata model may provide a relatively User- and/or business-friendly view of the underlying data sources, and may also record various properties and categorizations for individual or derived data elements. Examples of what can be defined in a metadata model may include, but are not limited to: (a) certain data elements may be categorized into dimensional hierarchies (for example, a geographic hierarchy, a product hierarchy, and/or a time based hierarchy (year>month>day>hour>second), among others); (b) aggregation rules or "roll up" behavior may be defined for facts or measures; (c) row level security strategies may be implemented; and/or (d) internationalization strategies for the data may be implemented. Many BI artifacts in a system are dependent upon a metadata model—in other words, such BI artifacts are may be written in terms of an associated metadata model, and when executed in a BI environment, the combination of supplied execution inputs, the security identity, the BI artifact and/or the associated metadata model are utilized by the BI software to query, summarize, post-process and render visualizations of data in the underlying data sources. Other BI artifacts may be authored directly against the underlying data sources (bypassing a metadata model).

"Report" is a type of BI artifact. The successful execution of a report in the BI environment will produce one or more "report outputs". A report may have many properties, including: name; description; policy set (e.g., security policies); screentip; specification (also known as report specification); associated metadata model; and/or others. A report may be generally linked with a specific metadata model and this linkage may be specified as a property on the report and/or in the report specification. Some reports may bypass a metadata model and directly access a BI data source.

"Report specification" is one property of a report. The Report specification may describe to the BI software how one or more data sources should be queried (most often through references to abstractions defined in the metadata model, although sometimes directly against underlying data sources); how intermediate result sets should be summarized, post-processed, and potentially merged with other datasets; and/or how the resultant datasets should be rendered visually. Report specifications may be authored within an editing tool provided by the vendor of the BI software (e.g., in IBM Cognos®, report specifications are edited in Report Studio). A report specification may encode most, if not all, of the information necessary for a BI system to service a report execution request. In some implementations, other properties, such as the associated metadata model or security policies, may be recorded as other properties on the report itself. Other types of BI artifacts also have specification properties ("BI artifact specifications") which serve a similar purpose.

"Report output" means an output produced by the execution (e.g., successful execution) of a report or a report specification in the BI environment. A report output may include one or more electronic files (or streams of data) in a format designated by a User (e.g., PDF, HTML, MHTML, CSV, Excel, Flash, Javascript, XML and/or other suitable formats). In the case of web oriented report outputs (e.g. HTML, XHTML, MHTML and/or other suitable formats), the report output file may contain references to other external resources (e.g. css files, javascript files, static images, dynamic images for charts and/or other visualizations, and/or vector graphics). A report output is a concrete example of the more generic term "BI output.". In general BI Artifacts may be authored and have an artifact specification property ("BI artifact specification"). End Users may execute a BI Artifact in the BI Environment to produce one or more BI outputs.

"Report execution inputs" means a variable set of inputs that can be passed to the BI software when executing a report or a report specification. As a non-limiting example, report execution inputs may include, but are not limited to, one or more of the following:

A set of parameter values that are passed during execution, e.g., StartDate=2005-01-01, EndDate=2005-01-31, Sectors={Financial, Telecommunications, Semiconductor}. These may be entered by a User in response to queries generated by the BI system and further constrain the results.

A set of desired output formats (e.g., PDF, HTML, CSV, and/or Excel, among others).

Delivery preferences (e.g., "the generated PDF report output should be emailed to the following 3 email addresses," "the CSV report output should be FTP'ed to the following server," etc.).

Directives regarding security identity on whose behalf the report should be executed.

Requested locale (e.g., run this report in French)

"Report execution profile" represents one way to run a report. A report execution profile may have a descriptive name and may contain a "report execution inputs" property that records selections for the variable set of inputs that will be passed to the BI software when executing a report via this particular report execution profile. A report execution profile may be saved so that it can be repeatedly used in the future. In IBM Cognos®, a Report View is one example of a report execution profile.

"Report execution request", which is also known by the acronym "RER", is a request for the BI system to execute a report. The RER may target a single report and include a "report execution inputs" object that specifies the desired preferences for this particular execution of the report (e.g., input parameters, output preferences, delivery preferences, locale, and/or other preferences). The successful processing of an RER by the BI system may generate one or more report outputs (e.g., one for each requested output format).

"Security principal" is a user, a group, or a role. In some implementations, a security principal may be defined in an external security source, in the SMS and/or elsewhere as appropriate. In applications which allow the definition of security policies (e.g. a BI environment), a security policy may be written in terms of one or more security principals and the level of access to which each of the one or more security principals is entitled. For example, a policy which grants a first level of access to a report may be granted in terms of a user, e.g. "Bob has read, write and execute permission on the report"; in terms of a group, e.g. "All members of the Dallas Region group have read access to the report"; and/or in terms of a role "All members of the Power Users role have read, write and execute access to the report". Security principals defined in the SMS may be referred to as "local principals," for example, a user defined in the SMS may be referred to as a "local user," a role defined in the SMS may be referred to as a "local role", a group defined in the SMS may be referred to as a "local group."

A "Namespace" exposes one or more security principals to a BI environment. Each exposed security principal is identified by the Namespace to the BI environment via a local identifier.

"Validation of security principals" or "validation of user identification information" occurs when one or more identifying aspects of a security principal are verified. For example, an identifying attribute of a security principal may be used to verify that a security principal exists (e.g., a user name may be used to obtain a reference to and/or ensure the existence of a user in an external security source).

"Authentication" occurs when provided user identification information (e.g., credentials) is verified to confirm the identity of a user. For example, a user may provide credentials (e.g., username; password, secure token, biometric key, HTTP header attribute, PIN number, and/or answer to a security question) and the identity of the user may be confirmed based on the credentials.

A "Local Identifier" is a unique identification of a security principal which may be used to reference the security principal from inside a BI environment. For example, a local identifier may uniquely identify a local user, a user from an external security source, a group or role from an external security source, a local group or role defined in the SMS, etc. Each local identifier may identify a different security principal. Local identifiers may be referenced by various aspects of a BI environment's content and/or configuration. For example, a local identifier may be referenced by a security policy which may grant or restrict access to resources, capabilities or functions in the BI environment. For example, a user may be granted access to a report in the BI environment through a security policy in the BI environment which references the local identifier associated with the user, references the report, and/or details the level of access which is granted to user with regard to the report. Each local user may be enabled access in the BI environment through a local identifier associated with the local user, in some implementations.

"User Identification Information" is information pertaining to a user which may be used to identify a user and/or make an authentication decision regarding the user. For example, user identification may include a user name, a user code, a password, a security image, a credential, other identification codes, etc. In some implementations, supplied user identification information may be sufficient to identify a user, but may be insufficient authenticate a user. For example, supplied user identification information which includes a logon or user name, but does not include a password may be sufficient to identify a user, but may be insufficient to make an authentication decision.

The invention claimed is:

1. A computer implemented method comprising:
retrieving at least a portion of a plurality of security principals defined in a First External Security Source;
retrieving, from a First Security Namespace, at least one or more local identifiers associated with one or more of the retrieved security principals, wherein each local identifier uniquely identifies one of the security principals in a Business Intelligence Environment, and wherein one or more of the local identifiers are generated by the First Security Namespace, and wherein the First Security Namespace exposes one or more of the security principals from the First External Security Source for functions in the Business Intelligence Environment using one or more of the local identifiers;
generating a mapping of at least a portion of the retrieved security principals and one or more of the retrieved associated local identifiers;
storing the generated mapping in a memory coupled to a Security Migration System, wherein the Security Migration System is distinct from the First External Security Source; and providing a Security Migration System Namespace adapted to coordinate with the Security Migration System to expose one or more of the security principals to the Business Intelligence Environment using one or more of the local identifiers from the generated mapping and previously used by the First Security Namespace, wherein the Security Migration System Namespace is distinct from the First Security Namespace, and wherein the Security Migration System Namespace enables access in the Business Intelligence Environment that is based on the generated mapping and that is independent of user authentication provided by the First External Security Source.

2. The method of claim 1 wherein access to the First External Security Source is restricted, wherein the Security Migration System Namespace is adapted to provide access in the Business Intelligence Environment, for one or more of the security principals defined in the First External Security Source, based on one or more of the local identifiers in the generated mapping when access to the First External Security Source is restricted.

3. The method of claim 1 further comprising replacing the First Security Namespace with the Security Migration System Namespace.

4. The method of claim 1 further comprising allowing the Security Migration System to self-validate at least a portion of the security principals based at least on the generated mapping.

5. The method of claim 1 further comprising:
retrieving one or more additional security principals defined in a Second External Security Source;
allowing the Security Migration System Namespace to be associated with one or more of the additional security principals, wherein the Security Migration System Namespace is adapted to generate one or more additional local identifiers, and wherein each additional local identifier uniquely identifies one of the additional security principals, and wherein the Security Migration System Namespace exposes one or more of the security principals from the Second External Security Source for functions in the Business Intelligence Environment using one or more of the additional local identifiers;
and allowing authentication of security principals utilizing at least one of the Second External Security Source or the Security Migration System Namespace;
wherein access in the Business Intelligence environment is enabled based on at least one of one or more of the local identifiers in the generated mapping or one or more of the additional local identifiers generated by the Security Migration System Namespace for the additional security principals.

6. The method of claim 1 further comprising:
retrieving one or more additional security principals defined in a Second External Security Source;
allowing the Security Migration System Namespace to be associated with one or more of the additional security principals, wherein the Security Migration System Namespace is adapted to generate one or more additional local identifiers, and wherein each additional local identifier uniquely identifies one of the additional security principals, and wherein the Security Migration System Namespace exposes one or more of the security principals from the Second External Security Source for functions in the Business Intelligence Environment using one or more of the additional local identifiers;
and allowing authentication of security principals utilizing at least one of the Second External Security Source or the Security Migration System Namespace;
wherein access in the Business Intelligence environment is enabled based on at least one of one or more of the local identifiers in the generated mapping or one or more of the additional local identifiers generated by the Security Migration System Namespace for the additional security principals, and wherein the Security Migration System Namespace is adapted to delegate validation of at least a portion of the security principals in the generated mapping to the Second External Security Source.

7. The method of claim 1 further comprising:
retrieving one or more additional security principals defined in a Second External Security Source;
allowing the Security Migration System Namespace to be associated with one or more of the additional security principals, wherein the Security Migration System Namespace is adapted to generate one or more additional local identifiers, and wherein each additional local identifier uniquely identifies one of the additional security principals, and wherein the Security Migration System Namespace exposes one or more of the security principals from the Second External Security Source for functions in the Business Intelligence Environment using one or more of the additional local identifiers;
allowing authentication of security principals utilizing at least one of the Second External Security Source or the Security Migration System Namespace;
identifying one or more matching security principals based on a determination of whether one or more of the security principals in the generated mapping are the same as one or more of the additional security principals;
and generating one or more additional associations in the mapping, wherein one or more of the additional associations comprises an association of one or more of the local identifiers in the mapping that are associated with one or more of the matching security principals and one or more of the additional security principals such that validation of a matching security principal is delegated to the Second External Security Source and such that access in the Business Intelligence Environment is enabled based on at least one of the local identifiers from the generated mapping;
wherein access in the Business Intelligence environment is enabled based on at least one of one or more of the local identifiers in the generated mapping or one or more of the additional local identifiers generated by the Security Migration System Namespace for the additional security principals.

8. The method of claim 1 further comprising identifying one or more candidate improvements, wherein identifying at least one candidate improvement comprises:
analyzing at least one of the generated mapping, security information, or access information;
and determining one or more candidate improvements based at least on the analysis.

9. The method of claim 1 further comprising identifying one or more candidate improvements, wherein identifying at least one candidate improvement comprises:
analyzing the generated mapping, wherein the analysis of the generated mapping identifies one or more differences in at least one of access, roles, or privilege for a user, and wherein identifying at least one candidate improvement comprises identifying one or more of the differences;
and determining one or more candidate improvements based at least on the analysis.

10. A computer implemented method comprising:
receiving an authentication request, for a Security Migration System Namespace, for authorization for access to a Business Intelligence Environment of a user based on provided user identification information, wherein the Security Migration System Namespace is adapted to coordinate with a Security Migration System to expose one or more security principals to the Business Intelligence Environment;
determining whether to authorize the access by requesting validation of the user based at least on the provided user identification information, wherein determining whether to authorize the access comprises:
determining a type of user based at least on the provided user identification information;
and authenticating the provided user identification information independently of an External Security Source if the type comprises a local user, the Security Migration System is distinct from the External Security Source;
determining a local identifier associated with the validated user at least based on a retrieved mapping, if a determination is made to authorize a user, wherein the retrieved mapping includes local identifiers generated by a different Security Namespace;
and enabling the access in the Business Intelligence Environment based at least on the determined local identifier.

11. The method of claim 10 further comprising delegating the request for authentication, based at least on the provided user identification information, from the Security Migration System Namespace to the External Security Source.

12. The method of claim 10 further comprising defining one or more new security principals to have access to the business intelligence environment, wherein defining a new user comprises:
    determining whether the new user is a local user;
    allowing authentication of the new user independent of an External Security Source if the new user is a local user;
    allowing authentication of the new user through the External Security Source if the new user is not a local user;
    and generating a new local identifier associated with the External Security Source if the new user is not a local user.

13. A computer implemented method comprising:
    receiving a request from a first user for access, as a second user, to a business intelligence environment, wherein the first user provides first user identification information associated with the first user and second user identification information associated with the second user, wherein the first user identification information comprises a set of two or more types of user identification information, and wherein the second user identification information includes a subset of the types of user identification information in the provided first user identification information;
    determining whether to allow the first user to access the business intelligence environment as the second user based at least on an access listing, wherein the access listing includes:
        user identification information for one or more authorized users authorized to access the business intelligence environment as another user;
        and at least one of user identities, user identification information, roles, or groups of users on which one or more of the authorized users is authorized to request access;
    determining a local identifier of the second user if the determination is made to allow the first user access as the second user, wherein determining a local identifier of a second user is at least based on a mapping retrieved through a Security Migration System Namespace, wherein the retrieved mapping includes one or more local identifiers generated by a different security namespace; and
    allowing the first user access to the business intelligence environment as the second user if the determination is made to allow the access, wherein the access in the business intelligence environment is enabled based on the determined local identifier of the second user.

14. The method of claim 13 further comprising generating an audit trail of at least one of access by the first user as the second user when the requested access is allowed or attempted access when the requested access is denied; and storing the audit trail.

15. The method of claim 13 further comprising:
    generating an audit trail of at least one of access by the first user as the second user when the requested access is allowed or attempted access when the requested access is denied;
    storing the audit trail;
    retrieving the audit trail;
    presenting the audit trail;
    and restricting alteration of at least a portion of the audit trail.

16. The method of claim 13 further comprising authenticating the first user identification information and validating the second user identification through a Security Migration System Namespace, wherein the Security Migration System Namespace authenticates based at least on a type of user.

17. The method of claim 13 further comprising authenticating the first user identification information and validating the second user identification through a Security Migration System Namespace, wherein the Security Migration System Namespace authenticates based at least on a type of user, and wherein authenticating the first user identification information based at least on the type of user comprises:
    determining the type of user based at least on the provided first user identification information;
    authenticating the provided first user identification information independently of an External Security Source if the user type comprises a local user;
    and delegating the authentication of the first user identification information to the External Security Source, if the user type does not comprises a local user.

18. The method of claim 13 further comprising authenticating the first user identification information and validating the second user identification through a Security Migration System Namespace, wherein the Security Migration System Namespace authenticates based at least on a type of user, and wherein validating the second user identification information based at least on the type of user comprises:
    determining the type of user based at least on the provided second user identification information;
    validating the provided second user identification information independently of an External Security Source if the user type comprises a local user;
    and delegating the validation of the second user identification information to the External Security Source, if the user type does not comprises a local user.

* * * * *